(12) United States Patent
Yu et al.

(10) Patent No.: US 8,547,922 B2
(45) Date of Patent: Oct. 1, 2013

(54) SIGNAL RESOURCE DETERMINATION METHOD

(75) Inventors: Guanghui Yu, Shenzhen (CN); Ruyue Li, Shenzhen (CN); Yunfeng Sun, Shenzhen (CN); Bo Dai, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,313

(22) PCT Filed: Jun. 10, 2010

(86) PCT No.: PCT/CN2010/073777
§ 371 (c)(1),
(2), (4) Date: Feb. 7, 2012

(87) PCT Pub. No.: WO2011/017973
PCT Pub. Date: Feb. 17, 2011

(65) Prior Publication Data
US 2012/0218950 A1 Aug. 30, 2012

(30) Foreign Application Priority Data
Aug. 14, 2009 (CN) .......................... 2009 1 0165673

(51) Int. Cl.
*H04W 4/00* (2009.01)
(52) U.S. Cl.
USPC ........... 370/329; 370/312; 370/478; 370/479; 370/480; 375/267; 375/354; 375/340
(58) Field of Classification Search
USPC ................. 370/312, 329, 478–480; 375/267, 375/354, 340, 141
See application file for complete search history.

(56) References Cited

U.S. PATENT DOCUMENTS

| 7,720,470 | B2 * | 5/2010 | Shi et al. ........................ | 455/425 |
| 7,796,639 | B2 * | 9/2010 | Buckley et al. ............... | 370/465 |
| 7,839,823 | B2 * | 11/2010 | Yu et al. ........................ | 370/329 |
| 7,929,417 | B2 * | 4/2011 | Jung et al. ..................... | 370/210 |
| 7,974,178 | B2 * | 7/2011 | Lomnitz et al. ............... | 370/208 |
| 8,005,154 | B2 * | 8/2011 | Kwon et al. ................... | 375/260 |
| 8,116,271 | B2 * | 2/2012 | Pi .................................. | 370/329 |
| 8,238,483 | B2 * | 8/2012 | Erell et al. .................... | 375/340 |

(Continued)

FOREIGN PATENT DOCUMENTS

| CN | 1658528 A | 8/2005 |
| CN | 101242217 A | 8/2008 |
| CN | 101388867 A | 3/2009 |
| CN | 101621492 A | 1/2010 |

OTHER PUBLICATIONS

International Search Report on international application No. PCT/CN2010/073777, mailed on Sep. 23, 2010.

(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

The present disclosure discloses a signal resource determination method, and the method includes that: carrying a dedicated demodulation data reference signal in a Resource Element (RE) on an Orthogonal Frequency Division Multiplexing (OFDM) symbol, wherein the OFDM symbol is in a non-control channel area of a Resource Block (RB) and carries a non-common reference signal.

14 Claims, 15 Drawing Sheets

(56) References Cited

U.S. PATENT DOCUMENTS

| | | | |
|---|---|---|---|
| 8,243,678 B2* | 8/2012 | Cudak et al. | 370/330 |
| 8,260,356 B2* | 9/2012 | Nam et al. | 455/561 |
| 2006/0153112 A1* | 7/2006 | Lim et al. | 370/310 |
| 2008/0080421 A1 | 4/2008 | Yu et al. | |
| 2009/0046582 A1* | 2/2009 | Sarkar et al. | 370/230.1 |
| 2009/0046672 A1* | 2/2009 | Malladi et al. | 370/336 |
| 2009/0227261 A1* | 9/2009 | Tiirola et al. | 455/450 |
| 2009/0252077 A1* | 10/2009 | Khandekar et al. | 370/312 |
| 2010/0061360 A1* | 3/2010 | Chen et al. | 370/342 |
| 2010/0062783 A1* | 3/2010 | Luo et al. | 455/450 |
| 2010/0067512 A1* | 3/2010 | Nam et al. | 370/342 |
| 2010/0103949 A1* | 4/2010 | Jung et al. | 370/468 |
| 2010/0195566 A1* | 8/2010 | Krishnamurthy et al. | 370/328 |
| 2010/0220800 A1* | 9/2010 | Erell et al. | 375/267 |
| 2010/0260059 A1* | 10/2010 | Zhang et al. | 370/252 |
| 2010/0260154 A1* | 10/2010 | Frank et al. | 370/336 |
| 2010/0322176 A1* | 12/2010 | Chen et al. | 370/329 |
| 2011/0243023 A1* | 10/2011 | Taoka et al. | 370/252 |
| 2011/0280333 A1* | 11/2011 | Yang et al. | 375/295 |

OTHER PUBLICATIONS

English Translation of the Written Opinion of the International Search Authority in international application No. PCT/CN2010/073777, mailed on Sep. 23, 2010.
3GPP TSG-RAN WG1#57 R1-091796 May 4, 2009.
3GPP TSG-RAN WG1#57b R1-092734 Jun. 29, 2009.
3GPP TSG-RAN WG1#57b R1-092798 Jun. 29, 2009.
3GPP TSG-RAN WG1#57b R1-092689 Jun. 29, 2009.
3GPP TSG-RAN WG1#57 R1-091757 May 4, 2009.
3GPP TSG-RAN WG1#57b R1-092472 Jun. 29, 2009.

* cited by examiner

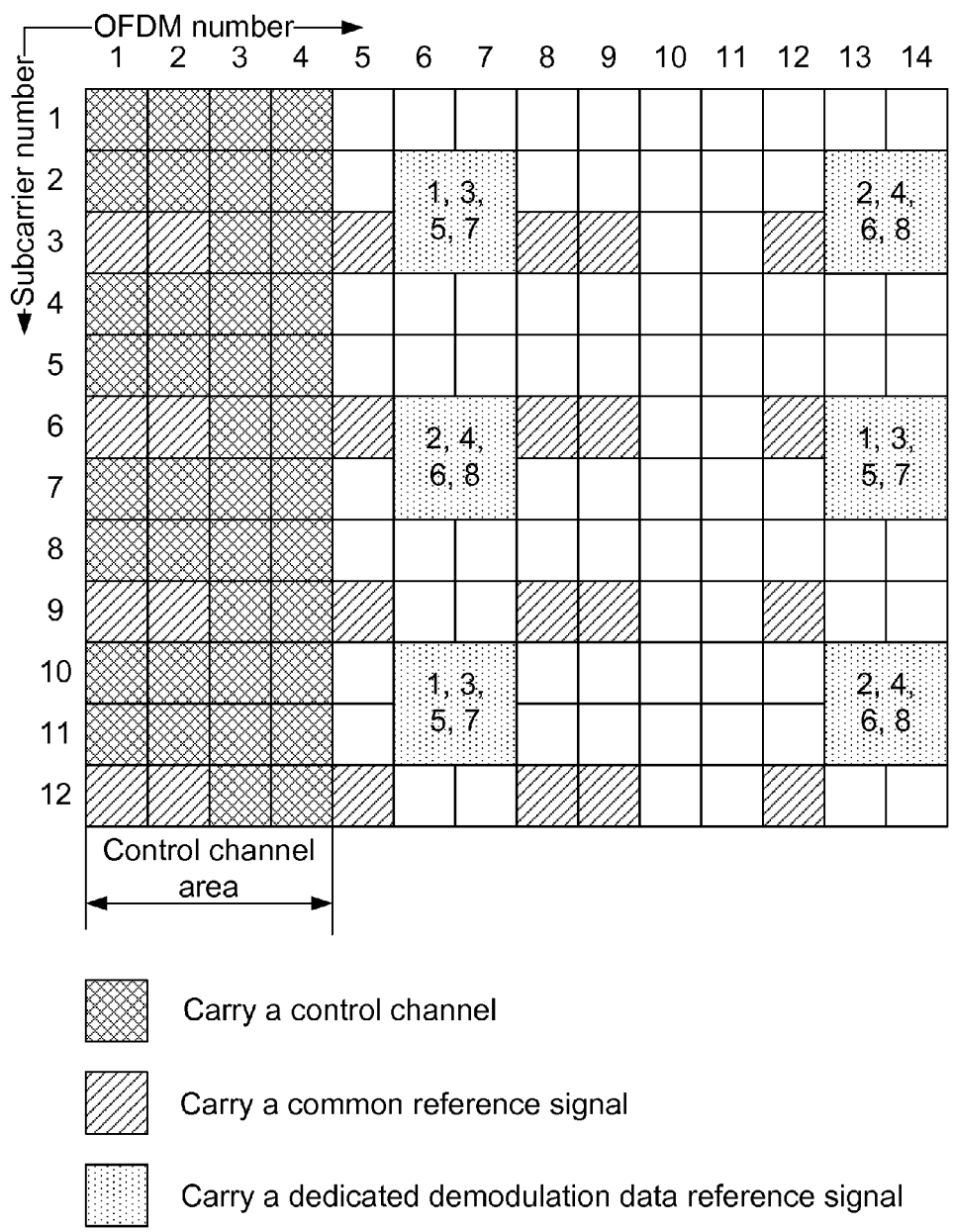

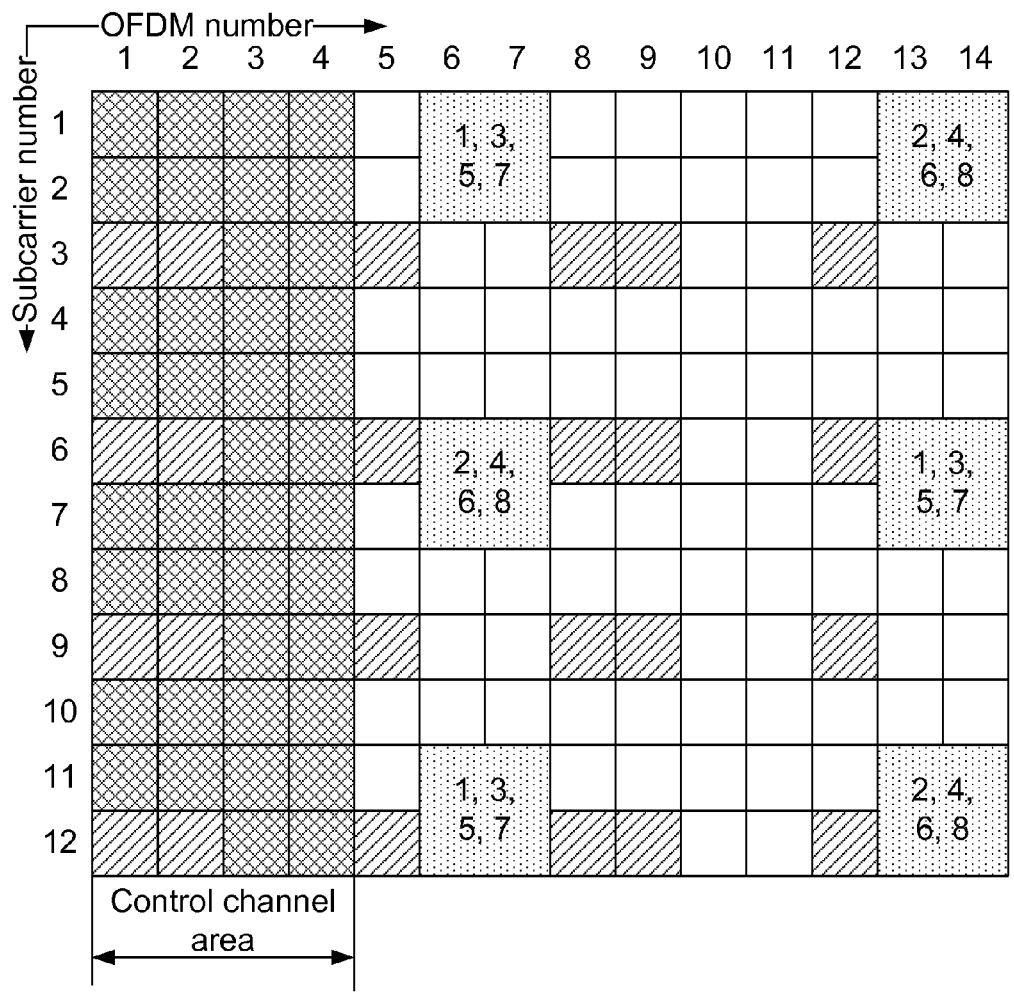

Carry a control channel

Carry a common reference signal

Carry a dedicated demodulation data reference signal

Control channel area

Carry a control channel

Carry a common reference signal

Carry a dedicated demodulation data reference signal

Carry a control channel

Carry a common reference signal

Carry a dedicated demodulation data reference signal

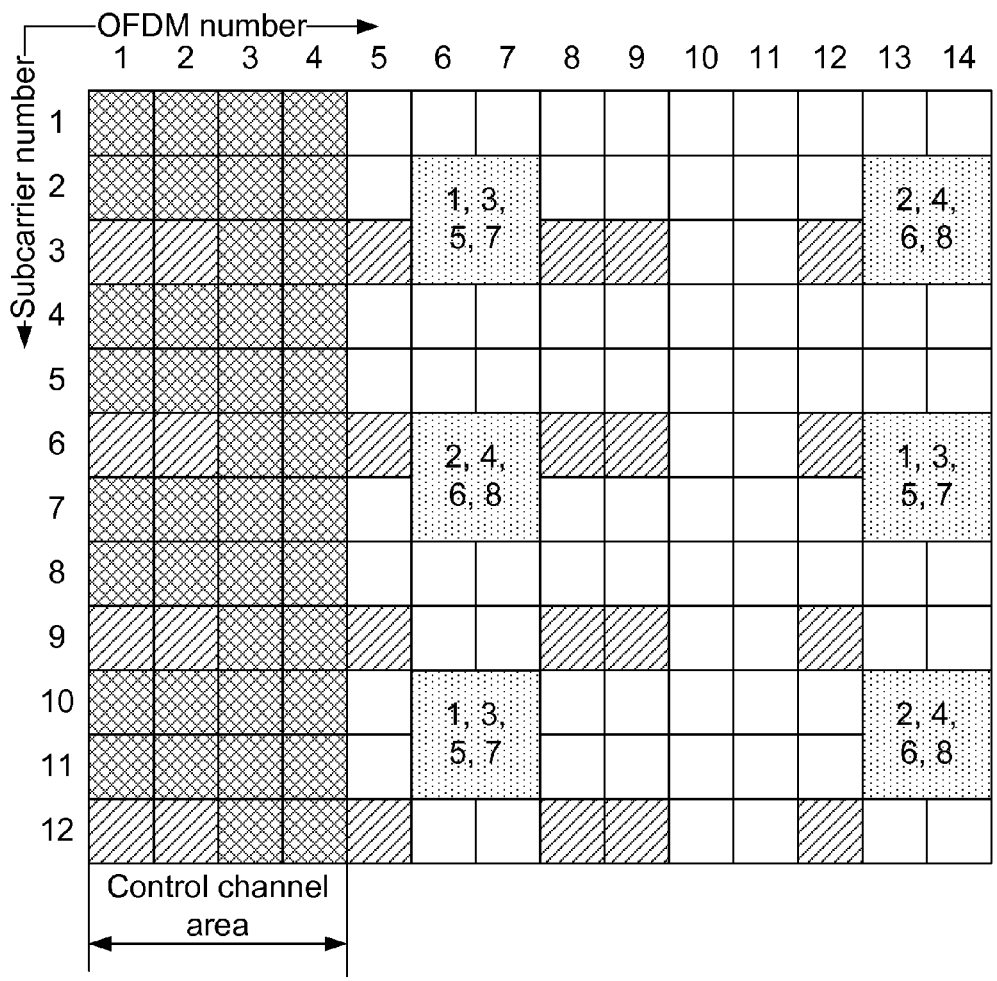

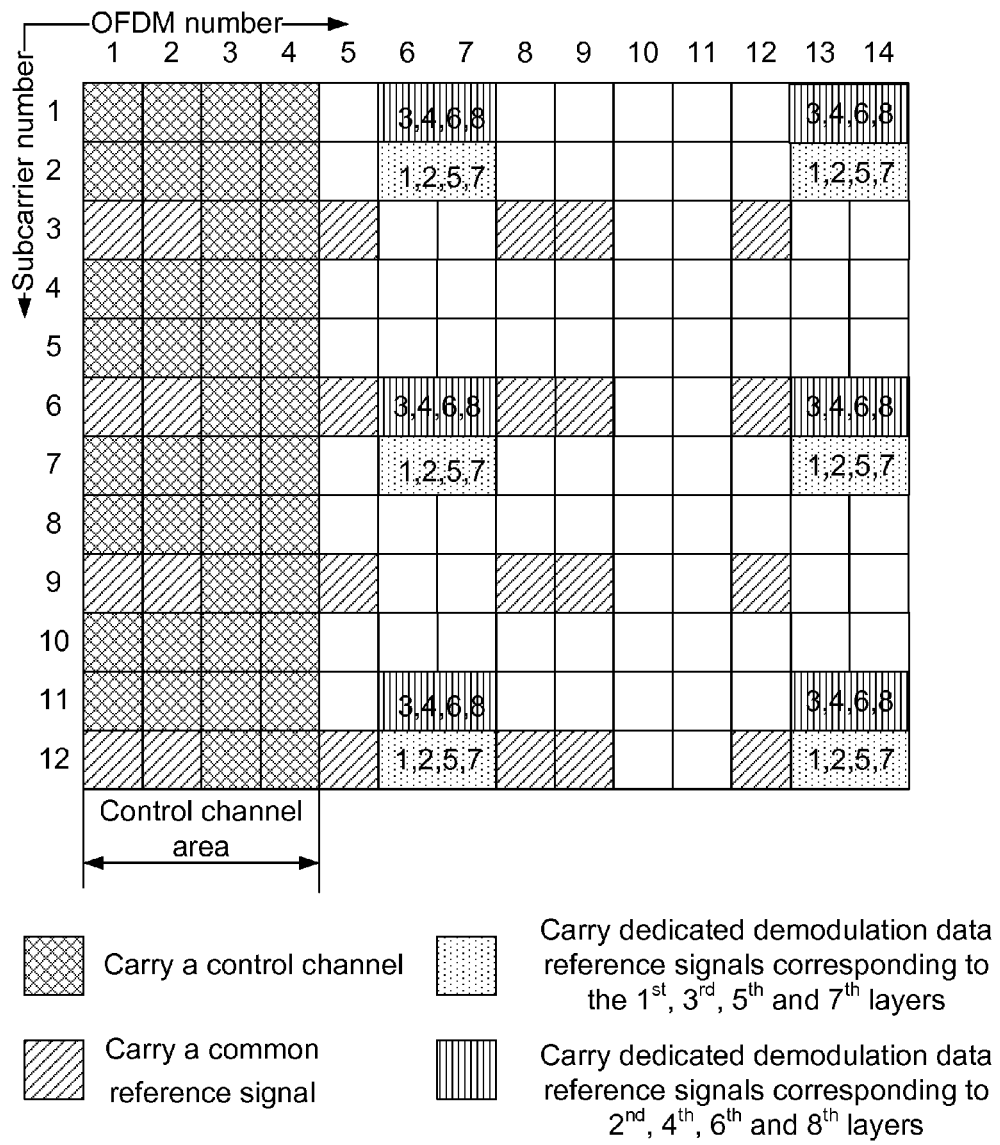

SIGNAL RESOURCE DETERMINATION METHOD

TECHNICAL FIELD

The present disclosure relates to the field of a reference signal in mobile communications, in particular to a signal resource determination method.

BACKGROUND

An Orthogonal Frequency Division Multiplexing (OFDM) technology is essentially a multicarrier modulation communication technology and also one of core technologies in B3G and 4G mobile communications. In a frequency domain, a multipath channel for the OFDM presents a feature of frequency selectivity decline; in order number to overcome the decline, the channel is classified into multiple sub-channels in the frequency domain, each sub-channel having an approximately flat frequency spectrum and being orthogonal with one another, therefore the frequency spectrums of the sub-channels are allowed to be overlapped with one another and the frequency spectrum resources can be maximally utilized.

A Multiple Input Multiple Output (MIMO) technology can increase the capacity of a system, improve transmission performance and well integrate with the OFDM and other physical layer technologies, thereby becoming a key technology of a B3G and 4G mobile communication system. With the intensive study of the MIMO technology, at present, it is generally acknowledged that closed-loop MIMO (adaptive MIMO) has more performance gains than open-loop MIMO, mainly because a transmitting side can pre-process a transmitted signal when acquiring all or partial channel information and disturbance information, thereby adapting to the change of the channel and disturbance. Such gains are mainly present in Multiuser MIMO (MU-MIMO) and Cooperation Multi-Point (CoMP) transmission modes. In these two modes, disturbance is very obvious, so it is more necessary to restrain the disturbance by pre-processing a transmitted signal at the transmitting side.

In an MIMO communication system, a reference signal is designed by two methods:

In one method, the reference signal is defined on a physical antenna port, and then a receiving end is informed via a signalling of a method adopted for pre-processing transmitted data (generally in a linear pre-coding manner). Such reference signals are called Common Reference Signals (CRS) because the designed signals are distributed on the whole system bandwidth and all receiving ends can perform channel estimation from themselves to an antenna port through the CRSs. Such CRSs can serve as measurement reference signals as well as demodulation data reference signals and occupy more resources because of their distribution on the whole bandwidth, therefore, the channel estimation is very accurate. However, for the CRSs, it is also necessary for the transmitting side to additionally inform the receiving end of the method for pre-processing transmitted data and the overhead is large when there are a large number of transmitting antennas, so the CRSs are not very suitable. MIMO transmission modes (except transmission mode 7) in a Long Term Evolution (LTE) system adopt such reference signals.

In the other method, the reference signal itself is pre-processed in the same way as data, and is a dedicated signal rather than a common reference signal and only distributed on the same bandwidth resources with the data because such reference signal may be pre-processed in different manners for each receiving end. Besides, being pre-processed in the same way as data, the reference signal cannot serve as a measurement reference signal (which is not within the discussion scope of the patent) but only serve as a demodulation data reference signal for coherent demodulation of data, so the reference signal of the second type is called a dedicated demodulation data reference signal. The dedicated demodulation data reference signal here should be defined on a Layer (the transmitted data is also carried on the layer for transmission) because the data and the reference signal are pre-processed in the same way. The pre-processing (pre-coding) refers to mapping from a physical antenna to a layer, each layer corresponding to different pre-processing of multiple physical antennas. At present, such dedicated demodulation data reference signal is used for an Enhanced Long Term Evolution (LTE-A) system.

In the LTE-A system, it is not only basically determined to adopt dedicated demodulation data reference signals but also stipulated that the dedicated demodulation data reference signals in each Resource Block (RB) has a total overhead of 12 Resource Elements (REs) when there are less than or equal to 2 layers and a total overhead of less than 24 REs when there are 3 to 8 layers.

Although the overhead of the dedicated demodulation data reference signals has been basically determined in the LTE-A system and other systems, the locations of the REs occupied by the signals in an RB and multiplexing methods among different layers are not determined at present.

SUMMARY

In order number to solve the technical problem, the present disclosure provides a signal resource determination method, to determine the location of an RE occupied by a dedicated demodulation reference signal in an RB.

In order number to solve the technical problem, the present disclosure provides a signal resource determination method, the method includes that: carrying a dedicated demodulation data reference signal in a Resource Element (RE) on an Orthogonal Frequency Division Multiplexing (OFDM), wherein the OFDM symbol is in a non-control channel area of a Resource Block (RB) and carries a non-common reference signal.

Preferably, the OFDM symbols which is in a non-control channel area of a Resource Block (RB) and carries an non-common reference signal may comprise the 6th, 7th, 10th, 11th, 13th and 14th OFDM symbols of each subcarrier in the resource block.

Preferably, the method further comprises: before the step of carrying the dedicated demodulation data reference signal, classifying different number of layers and determining locations of the dedicated demodulation data reference signals for different types of the layers respectively.

Preferably, the step of classifying different number of layers may comprise: classifying the different number of layers into two types: the 1st type if a total layer number is 1 or 2; and the 2nd type if a total layer number is more than 2; or, classifying the different number of layers into 3 types: the 1st type if a total layer number is 1 or 2; the 2nd type if a total layer number is 3 or 4; and the 3rd type if a total layer number is more than 4;

wherein the dedicated demodulation data reference signals on different layers of the same type have the same overhead; and relative two-dimension time-frequency locations of REs occupied by the dedicated demodulation data reference signals of the same type are in a same, translational or symmetrical relationship.

Preferably, the step of classifying different number of layers may further comprise: when classifying the different number of layers into 2 types, dedicated demodulation data reference signals on all the layers of the 1st type have a total overhead of 12 REs; and dedicated demodulation data reference signals on all the layers of the 2nd type have a total overhead of 24 REs; or, when classifying the different number of layers into 3 types, dedicated demodulation data reference signals on all the layers of the 1st type have a total overhead of 12 REs; dedicated demodulation data reference signals on all the layers of the 2nd type have a total overhead of 12 or 24 REs and dedicated demodulation data reference signals on all the layers of the 3rd type have a total overhead of 24 REs.

Preferably, the step of classifying different number of layers may further comprise:

multiplexing the dedicated demodulation data reference signals on different layers of the same type in a code division multiplexing way, wherein the orthogonal code used here is a Walsh orthogonal code and an order number of the code division multiplexing is the power of 2.

Preferably, the length of each orthogonal code may be equal to the order number of the code division multiplexing and the number of occupied REs.

Preferably, the step of classifying different number of layers may further comprise: increasing the power of dedicated demodulation data reference signals on each layer when the number of actually used layers is less than the order number of the code division multiplexing of the same type.

Preferably, indexes of the dedicated demodulation data reference signals may be physical resources of the dedicated demodulation data reference signals on the layer which is uniquely determined by the types and orthogonal code indexes.

Preferably, in the step of classifying different number of layers, when the different number of layers are classified into two types, the locations of the dedicated demodulation data reference signals of the 1st type in the RB may be:

the 2nd subcarrier on the 6th, 7th, 13th and 14th OFDM symbols;
the 6th subcarrier on the 6th, 7th, 13th and 14th OFDM symbols; and
the 10th subcarrier on the 6th, 7th, 13th and 14th OFDM symbols;
or,
the 2nd subcarrier on the 6th, 7th, 13th and 14th OFDM symbols;
the 7th subcarrier on the 6th, 7th, 13th and 14th OFDM symbols; and
the 12th subcarrier on the 6th, 7th, 13th and 14th OFDM symbols;
and,
the locations of the dedicated demodulation data reference signals of the 2nd type in the RB may be:
the 2nd subcarrier on the 6th, 7th, 13th and 14th OFDM symbols;
the 3rd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 10th subcarrier on the 6th, 7th, 13th and 14th OFDM symbols; and
the 11th subcarrier on the 6th, 7th, 13th and 14th OFDM symbols;
or,
the 1st subcarrier on the 6th, 7th, 13th and 14th OFDM symbols;
the 2nd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 11th subcarrier on the 6th, 7th, 13th and 14th OFDM symbols; and
the 12th subcarrier on the 6th, 7th, 13th and 14th OFDM symbols.

Preferably, in the step of classifying different number of layers, when classifying the different number of layers into two types, in the 1st type, two adjacent REs may perform the code division multiplexing using a two-order Walsh orthogonal code and correspond to dedicated demodulation data reference signals on two layers respectively;

24 REs of the 2nd type are classified into 6 groups each having 4 REs, wherein the 1st group includes the 2nd and 3rd subcarriers on the 6th and 7th OFDM symbols;
the 2nd group includes the 2nd and 3rd subcarriers on the 13th and 14th OFDM symbols;
the 3rd group includes the 6th and 7th subcarriers on the 6th and 7th OFDM symbols;
the 4th group includes the 6th and 7th subcarriers on the 13th and 14th OFDM symbols;
the 5th group includes the 10th and 11th subcarriers on the 6th and 7th OFDM symbols; and
the 6th group includes the 10th and 11th subcarriers on the 13th and 14th OFDM symbols;
or,
the 1st group includes the 2nd subcarrier on the 6th, 7th, 13th and 14th OFDM symbols;
the 2nd group includes the 3rd subcarrier on the 6th, 7th, 13th and 14th OFDM symbols;
the 3rd group includes the 6th subcarrier on the 6th, 7th, 13th and 14th OFDM symbols;
the 4th group includes the 7th subcarrier on the 6th, 7th, 13th and 14th OFDM symbols;
the 5th group includes the 10th subcarrier on the 6th, 7th, 13th and 14th OFDM symbols; and
the 6th group includes the 11th subcarrier on the 6th, 7th, 13th and 14th OFDM symbols;
or,
the 1st group includes the 1st subcarrier on the 6th, 7th, 13th and 14th OFDM symbols;
the 2nd group includes the 2nd subcarrier on the 6th, 7th, 13th and 14th OFDM symbols;
the 3rd group includes the 6th subcarrier on the 6th, 7th, 13th and 14th OFDM symbols;
the 4th group includes the 7th subcarrier on the 6th, 7th, 13th and 14th OFDM symbols;
the 5th group includes the 11th subcarrier on the 6th, 7th, 13th and 14th OFDM symbols; and
the 6th group includes the 12th subcarrier on the 6th, 7th, 13th and 14th OFDM symbols;
dedicated demodulation data reference signals corresponding to the 1st, 3rd, 5th and 7th layers are carried in the 1st, 4th and 5th groups; and dedicated demodulation data reference signals corresponding to the 2nd, 4th, 6th and 8th layers are carried in the 2nd, 3rd and 6th groups; or,
dedicated demodulation data reference signals corresponding to the 1st, 3rd, 5th and 7th layers are carried in the 2nd, 3rd and 6th groups; and dedicated demodulation data reference signals corresponding to the 2nd, 4th, 6th and 8th layers are carried in the 1st, 4th and 5th groups; or, dedicated demodulation data reference signals corresponding to the 1st, 2nd, 5th and 7th layers are carried in the 2nd, 4th and 6th groups; and dedicated demodulation data reference signals corresponding to the 3rd, 4th, 6th and 8th layers are carried in the 1st, 3rd and 5th groups; and dedicated demodulation data reference signals corresponding to 4 layers in the same group are subjected to the code division multiplexing using a four-order Walsh orthogonal code.

Preferably, in the step of classifying different number of layers, when classifying the different number of layers into two types, the locations of the dedicated demodulation data reference signals of the 1st type in the RB may be:

the 1st subcarrier on the 6th, 7th, 13th and 14th OFDM symbols;

the 6th subcarrier on the 6th, 7th, 13th and 14th OFDM symbols; and the 11th subcarrier on the 6th, 7th, 13th and 14th OFDM symbols;

and, the locations of the dedicated demodulation data reference signals of the 2nd type in the RB may be:

the 1st subcarrier on the 6th, 7th, 13th and 14th OFDM symbols;

the 2nd subcarrier on the 6th, 7th, 13th and 14th OFDM symbols;

the 6th subcarrier on the 6th, 7th, 13th and 14th OFDM symbols;

the 7th subcarrier on the 6th, 7th, 13th and 14th OFDM symbols;

the 11th subcarrier on the 6th, 7th, 13th and 14th OFDM symbols; and the 12th subcarrier on the 6th, 7th, 13th and 14th OFDM symbols.

Preferably, in the step of classifying different number of layers, when classifying the different number of layers into two types, in the 1st type, two adjacent REs may perform the code division multiplexing using a two-order Walsh orthogonal code and correspond to dedicated demodulation data reference signals on two layers respectively;

24 REs of the 2nd type may be classified into 6 groups each having 4 REs, wherein the 1st group includes the 1st and 2nd subcarrier on the 6th and 7th OFDM symbols;

the 2nd group includes the 1st and 2nd subcarrier on the 13th and 14th OFDM symbols;

the 3rd group includes the 6th and 7th subcarrier on the 6th and 7th OFDM symbols;

the 4th group includes the 6th and 7th subcarrier on the 13th and 14th OFDM symbols;

the 5th group includes the 11th and 12th subcarrier on the 6th and 7th OFDM symbols; and the 6th group includes the 11th and 12th subcarrier on the 13th and 14th OFDM symbols;

dedicated demodulation data reference signals corresponding to the 1st, 3rd, 5th and 7th layers are carried in the 1st, 4th and 5th groups; and dedicated demodulation data reference signals corresponding to the 2nd, 4th, 6th and 8th layers are carried in the 2nd, 3rd and 6th groups; or, dedicated demodulation data reference signals corresponding to the 1st, 3rd, 5th and 7th layers are carried in the 2nd, 3rd and 6th groups; and dedicated demodulation data reference signals corresponding to the 2nd, 4th, 6th and 8th layers are carried in the 1st, 4th and 5th groups; and dedicated demodulation data reference signals corresponding to 4 layers in the same group are subjected to the code division multiplexing using a four-order Walsh orthogonal code.

Preferably, in the step of classifying different number of layers, when classifying the different number of layers into three types, the locations of the dedicated demodulation data reference signals of the 1st type in the RB may be:

the 2nd subcarrier on the 6th, 7th, 13th and 14th OFDM symbols;

the 6th subcarrier on the 6th, 7th, 13th and 14th OFDM symbols; and the 10th subcarrier on the 6th, 7th, 13th and 14th OFDM symbols;

corresponding locations of the dedicated demodulation data reference signals of the 2nd type which occupy 12 REs in the RB may be:

the 2nd subcarrier on the 6th, 7th, 13th and 14th OFDM symbols;

the 6th subcarrier on the 6th, 7th, 13th and 14th OFDM symbols; and the 10th subcarrier on the 6th, 7th, 13th and 14th OFDM symbols;

corresponding locations of the dedicated demodulation data reference signals of the 2nd type which occupy 24 REs in the RB may be:

the 2nd subcarrier on the 6th, 7th, 13th and 14th OFDM symbols;

the 3rd subcarrier on the 6th, 7th, 13th and 14th OFDM symbols;

the 6th subcarrier on the 6th, 7th, 13th and 14th OFDM symbols;

the 7th subcarrier on the 6th, 7th, 13th and 14th OFDM symbols;

the 10th subcarrier on the 6th, 7th, 13th and 14th OFDM symbols; and the 11th subcarrier on the 6th, 7th, 13th and 14th OFDM symbols;

and, locations of the dedicated demodulation data reference signals of the 3rd type in the RB may be:

the 2nd subcarrier on the 6th, 7th, 13th and 14th OFDM symbols;

the 3rd subcarrier on the 6th, 7th, 13th and 14th OFDM symbols;

the 6th subcarrier on the 6th, 7th, 13th and 14th OFDM symbols;

the 7th subcarrier on the 6th, 7th, 13th and 14th OFDM symbols;

the 10th subcarrier on the 6th, 7th, 13th and 14th OFDM symbols; and the 11th subcarrier on the 6th, 7th, 13th and 14th OFDM symbols.

Preferably, in the step of classifying different number of layers, when classifying the different number of layers into three types, in the 1st type, two adjacent REs may perform the code division multiplexing using a two-order Walsh orthogonal code and correspond to dedicated demodulation data reference signals on two layers respectively;

when the dedicated demodulation data reference signals of the 2nd type occupy 12 REs in the RB, the 12 REs may be classified into 6 groups each having 2 REs, wherein the 1st group includes the 2nd subcarrier on the 6th and 7th OFDM symbols;

the 2nd group includes the 2nd subcarrier on the 13th and 14th OFDM symbols;

the 3rd group includes the 6th subcarrier on the 6th and 7th OFDM symbols;

the 4th group includes the 6th subcarrier on the 13th and 14th OFDM symbols;

the 5th group includes the 10th subcarrier on the 6th and 7th OFDM symbols; and the 6th group includes the 10th subcarrier on the 13th and 14th OFDM symbols;

dedicated demodulation data reference signals corresponding to the 1st and 3rd layers are carried in the 1st, 4th and 5th groups; and dedicated demodulation data reference signals corresponding to the 2nd and 4th layers are carried in the 2nd, 3rd and 6th groups; or, dedicated demodulation data reference signals corresponding to the 1st and 3rd layers are carried in the 2nd, 3rd and 6th groups; and dedicated demodulation data reference signals corresponding to the 2nd and 4th layers are carried in the 1st, 4th and 5th groups; and dedicated demodulation data reference signals corresponding to 2 layers in the same group are subjected to the code division multiplexing using a two-order Walsh orthogonal code.

When the dedicated demodulation data reference signals of the 2nd type occupy 24 REs in the RB, four adjacent REs may perform the code division multiplexing using a four-order Walsh orthogonal code and correspond to dedicated demodulation data reference signals on four layers respectively;

24 REs of the 2nd type may be classified into 6 groups each having 4 REs, wherein the 1st group includes the 2nd and 3rd subcarriers on the 6th and 7th OFDM symbols;

the 2nd group includes the 2nd and 3rd subcarriers on the 13th and 14th OFDM symbols;

the 3rd group includes the 6th and 7th subcarriers on the 6th and 7th OFDM symbols;

the 4th group includes the 6th and 7th subcarriers on the 13th and 14th OFDM symbols;

the 5th group includes the 10th and 11th subcarrier on the 6th and 7th OFDM symbols; and the 6th group includes the 10th and 11th subcarriers on the 13th and 14th OFDM symbols;

dedicated demodulation data reference signals corresponding to the 1st, 3rd, 5th and 7th layers are carried in the 1st, 4th and 5th groups; and dedicated demodulation data reference signals corresponding to the 2nd, 4th, 6th and 8th layers are carried in the 2nd, 3rd and 6th groups; or, dedicated demodulation data reference signals corresponding to the 1st, 3rd, 5th and 7th layers are carried in the 2nd, 3rd and 6th groups; and dedicated demodulation data reference signals corresponding to the 2nd, 4th, 6th and 8th layers are carried in the 1st, 4th and 5th groups; and dedicated demodulation data reference signals on 4 layers in the same group are subjected to the code division multiplexing using a four-order Walsh orthogonal code.

Compared with the related technologies, the method for determining resources of dedicated demodulation data reference signal defined on a layer uses a few signalling and modes, is convenient to be implemented by hardware and transparent to an MU-MIMO receiving end (including MU-MIMO in the CoMP) and can fully use transmission power.

BRIEF DESCRIPTION OF THE DRAWINGS

FIG. 2(B) shows a diagram of locations of dedicated demodulation data reference signals of the 2nd type in an RB in the first embodiment of the disclosure;

FIG. 3(B) shows a diagram of locations of dedicated demodulation data reference signals of the 2nd type in an RB in the second embodiment of the disclosure;

FIG. 6(C) shows a diagram of locations of dedicated demodulation data reference signals of the 3rd type in an RB in the fifth embodiment of the disclosure;

FIG. 7(B) shows a diagram of locations of dedicated demodulation data reference signals of the 2nd type in an RB in the sixth embodiment of the disclosure.

DETAILED DESCRIPTION

The implementation of the present disclosure is described below with reference to drawings and embodiments in detail so as to fully understand and implement the implementation process of solving the technical problem by a technical measure to achieve the technical effect in the present disclosure.

Figure 1:
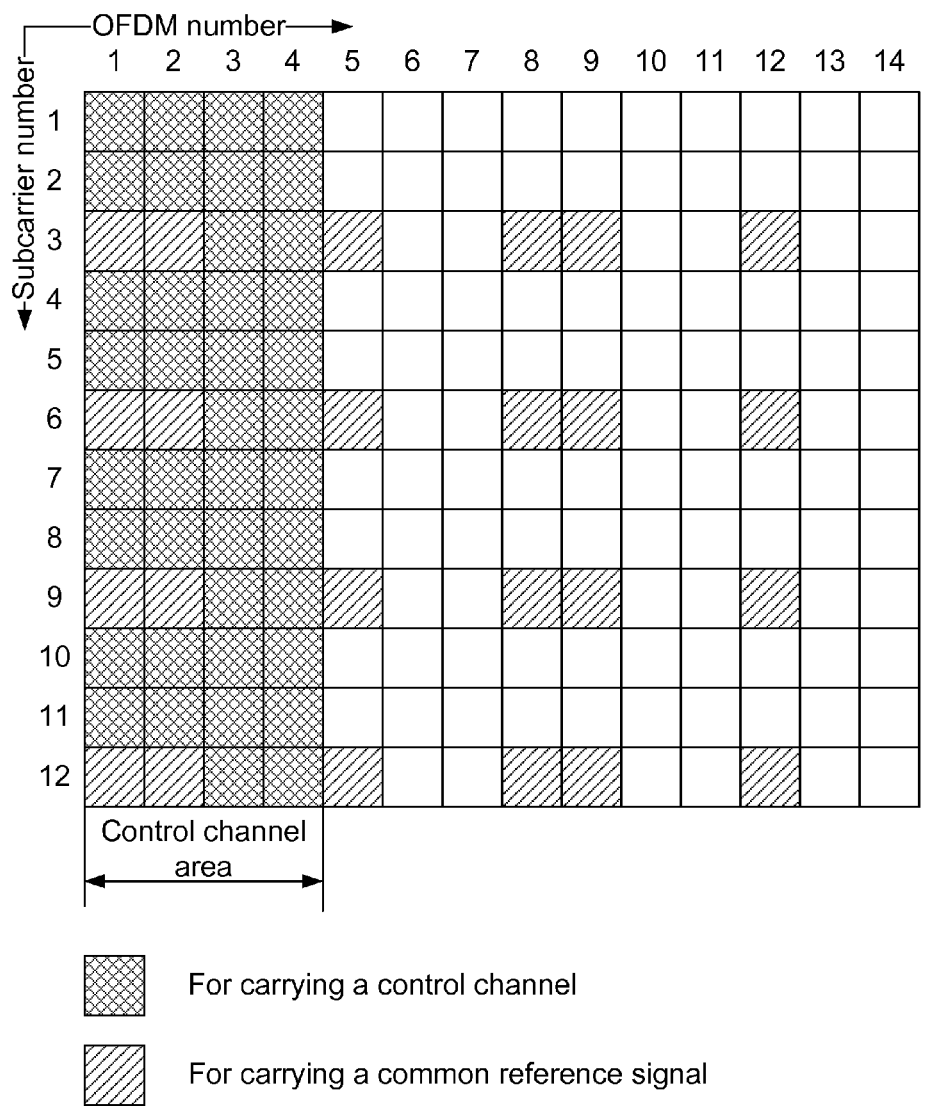
FIG. 1 shows a diagram of physical resource locations of common reference signals and their control signallings in an RB in the related technologies.

FIG. 1 shows a diagram of the structure of an RB in an existing LTE-A. As shown in FIG. 1, a square represents an RE; and an RB occupies 12 subcarriers in a frequency domain and 14 OFDM symbols (Normal CP) in a time domain, wherein the first 4 OFDM symbols may be used for carrying control channels, so that any dedicated demodulation data reference signal cannot be carried on the first 4 OFDM symbols.

Since the LTE allows common reference signals of different cells to translate (a frequency-hopping manner) on different subcarrier on the same OFDM symbol, these common reference signals and their frequency hopping manners are still remained in an RB of the LTE-A in order number to be backward compatible with the LTE, so that any dedicated demodulation data reference signal cannot be carried on the OFDM symbols where these REs are located. Therefore, only REs on OFDM symbols which are located in a non-control channel area and carry non-common reference signal in the RB can carry the dedicated demodulation data reference signals of the LTE-A, i.e., the REs of the 6th, 7th, 10th, 11th, 13th and 14th OFDM symbols in the RB.

In the method for determining resources for dedicated demodulation data reference signals, in order number to reduce the overhead of a reference signal and a control signaling, classification is performed on different number of layers, and dedicated demodulation data reference signals and a method for multiplexing the reference signals are determined for different types. In the technical solution of the disclosure, layers can be classified into 2 or 3 types according to the number of layers; if classified into 2 types, those with a total layer number of 1 or 2 are of the 1st type, and those with a total layer number of more than 2 are of the 2nd type; if classified into 3 types, those with a total layer number of 1 or 2 are of the 1st type, those with a total layer number of 3 or 4 are of the 2nd type, and those with a total layer number of more than 4 are of the 3rd type.

Dedicated demodulation data reference signals on different layers of the same type have the same overhead; and the relative two-dimension time-frequency locations of multiple REs occupied by the dedicated demodulation data reference signals of the same type are in a certain mutual relationship.

If the layers are classified into 2 types, dedicated demodulation data reference signals on all the layers of the 1st type have a total overhead of 12 REs; and those on all the layers of the 2nd type have a total overhead of 24 REs.

If the layers are classified into 3 types, dedicated demodulation data reference signals on all the layers of the 1st type have a total overhead of 12 REs; demodulation data reference signals on all the layers of the 2nd type have a total overhead of 12 or 24 REs and demodulation data reference signals on all the layers of the 3rd type have a total overhead of 24 REs.

Dedicated demodulation data reference signals on each layer only can use a non-control channel area (REs on the OFDM symbols after the 4th OFDM symbol) and be located on REs on OFDM symbols where an LTE common reference signal is not located, that is to say, it only can use REs on the 6th, 7th, 10th, 11th, 13th and 14th OFDM symbols.

The relative two-dimension time-frequency locations of multiple REs occupied by the dedicated demodulation data reference signals on the same layer are in a same, translational or symmetrical relationship, wherein the 'same' means that the two-dimension time-frequency locations are completely the same, the 'translational' means that the two-dimension time-frequency locations are wholly translational in a time domain or a frequency domain, and the 'symmetrical' means that the two-dimension time-frequency locations are in axial symmetrical, central symmetrical and other symmetrical relationships respectively.

Dedicated demodulation data reference signals on different layers of the same type are multiplexed in a Code Division Multiplexing (CDM) way. The orthogonal code used here is a Walsh orthogonal code, so that the maximal multiplexed layer number (the order number of the CDM) is the power of 2, i.e., 2, 4 or 8. The length of each orthogonal code is equal to the order number of the CDM and the number of the occupied REs.

If the number of actually used layers is less than the maximal multiplexed layer number in the same type, the power of the dedicated demodulation data reference signals on each layer can be increased. Like the dedicated demodulation data reference signals, data is also increased in power, so that it is unnecessary to inform a receiving end of an increased power of the dedicated demodulation data reference signals.

The index of each layer, i.e., the indexes of dedicated demodulation data reference signals, are physical resources of the dedicated demodulation data reference signals on the layer determined by types and orthogonal code indexes.

It can be seen from the contents above that the methods for determining and multiplexing physical resource locations of dedicated demodulation data reference signals on a layer use a few signallings and modes, are convenient to be implemented by hardware and transparent to an MU-MIMO receiving end (including MU-MIMO in CoMP) and can fully use transmission power.

For the further understanding of the disclosure, the embodiments of the method for determining dedicated demodulation data reference signals on a layer are provided below with reference to drawings.

It should be explained at first that a horizontal coordinate represents a time domain (OFDM symbol index) and a longitudinal coordinate represents a frequency domain (subcarrier index) in each drawing.

First Embodiment

In the embodiment, the numbers of layers are classified into two types, i.e.: the 1st type if a total layer number is 1 or 2, and the 2nd type if a total layer number is more than 2.

Figure 2A:
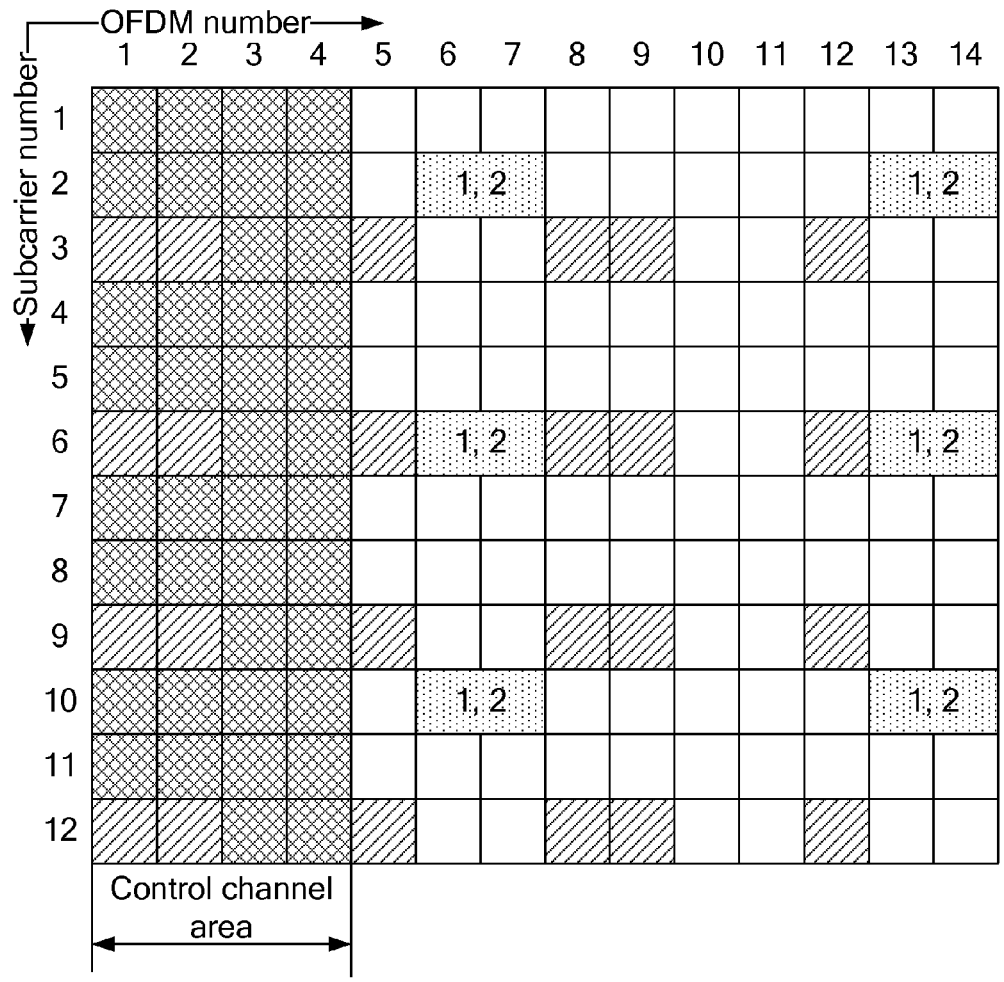
FIG. 2(A) shows a diagram of locations of dedicated demodulation data reference signals of the 1st type in an RB in the first embodiment of the disclosure.

FIG. 2(A) shows a diagram of locations of dedicated demodulation data reference signals of the 1st type in an RB. As shown in FIG. 2(A), all the dedicated demodulation data reference signals of the 1st type occupy 12 REs in the RB, whose locations in the RB can be represented by coordinates (x, y) as follows:

(6, 2) (7, 2) (13, 2) (14, 2)
(6, 6) (7, 6) (13, 6) (14, 6)
(6, 10) (7, 10) (13, 10) (14, 10);

wherein x represents an OFDM symbol index in the RB and y represents a subcarrier index in the RB. Unless specially explained, the locations of the REs in the RB are represented by coordinates (x, y) in each of the following embodiments.

Or, the locations of the dedicated demodulation data reference signals of the 1st type in the RB can also be represented by:

the 2nd subcarrier on the 6th, 7th, 13th and 14th OFDM symbols;
the 6th subcarrier on the 6th, 7th, 13th and 14th OFDM symbols; and
the 10th subcarrier on the 6th, 7th, 13th and 14th OFDM symbols.

It should be noted that the locations of the dedicated demodulation data reference signals in the RB are represented by OFDM and subcarrier numbers unless specially explained, and counting is started from 1 in both the time domain (OFDM symbol index) and the frequency domain (subcarrier index).

FIG. 2(B) shows a diagram of locations of dedicated demodulation data reference signals of the 2nd type in the RB. As shown in FIG. 2(B), all the dedicated demodulation data reference signals of the 2nd type occupy 24 REs in the RB, whose locations in the RB can be represented by coordinates (x, y) as follows:

(6, 2) (7, 2) (13, 2) (14, 2)
(6, 3) (7, 3) (13, 3) (14, 3)
(6, 6) (7, 6) (13, 6) (14, 6)
(6, 7) (7, 7) (13, 7) (14, 7)
(6, 10) (7, 10) (13, 10) (14, 10)
(6, 11) (7, 11) (13, 11) (14, 11).

Or, the locations of the dedicated demodulation data reference signals of the 2nd type in the RB can also be represented by:

the 2nd subcarrier on the 6th, 7th, 13th and 14th OFDM symbols;
the 3rd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 10th subcarrier on the 6th, 7th, 13th and 14th OFDM symbols; and
the 11th subcarrier on the 6th, 7th, 13th and 14th OFDM symbols.

In the 1st type, two adjacent REs perform the multiplexing using a two-order Walsh orthogonal code in a CDM way and correspond to dedicated demodulation data reference signals on two layers respectively.

In the 2nd type, 24 REs are classified into 6 groups each having 4 REs and the locations of the 6 groups in the RB can be represented by the following coordinates (x, y):

the 1st group: (6, 2) (7, 2) (6, 3) (7, 3);
the 2nd group: (13, 2) (14, 2) (13, 3) (14, 3);
The 3rd group: (6, 6) (7, 6) (6, 7) (7, 7);
the 4th group: (13, 6) (14, 6) (13, 7) (14, 7);
The 5th group: (6, 10) (7, 10) (6, 11) (7, 11); and
the 6th group: (13, 10) (14, 10) (13, 11) (14, 11).

Or, the 6 groups can also be represented by:
the 1st group: the 2nd and 3rd subcarriers on the 6th and 7th OFDM symbols;
the 2nd group: the 2nd and 3rd subcarriers on the 13th and 14th OFDM symbols;
the 3rd group: the 6th and 7th subcarriers on the 6th and 7th OFDM symbols;
the 4th group: the 6th and 7th subcarriers on the 13th and 14th OFDM symbols;
the 5th group: the 10th and 11th subcarriers on the 6th and 7th OFDM symbols; and
the 6th group: the 10th and 11th subcarriers on the 13th and 14th OFDM symbols, wherein the dedicated demodulation data reference signals corresponding to the 1st, 3rd, 5th and 7th (or 2nd, 4th, 6th and 8th) layers are carried in the 1st, 4th and 5th groups and subjected to the CDM using a four-order Walsh orthogonal code in the same group; and
the dedicated demodulation data reference signals corresponding to the 2nd, 4th, 6th and 8th (or 1st, 3rd, 5th and 7th) layers are carried in the 2nd, 3rd and 6th groups and subjected to the CDM using a four-order Walsh orthogonal code in the same group, as shown in FIG. 2(A) and FIG. 2(B).

Second Embodiment

Layers are classified into two types according to the number of layers, i.e.: the 1st type if a total layer number is 1 or 2; and the 2nd type if a total number is more than 2.

Figure 3A:
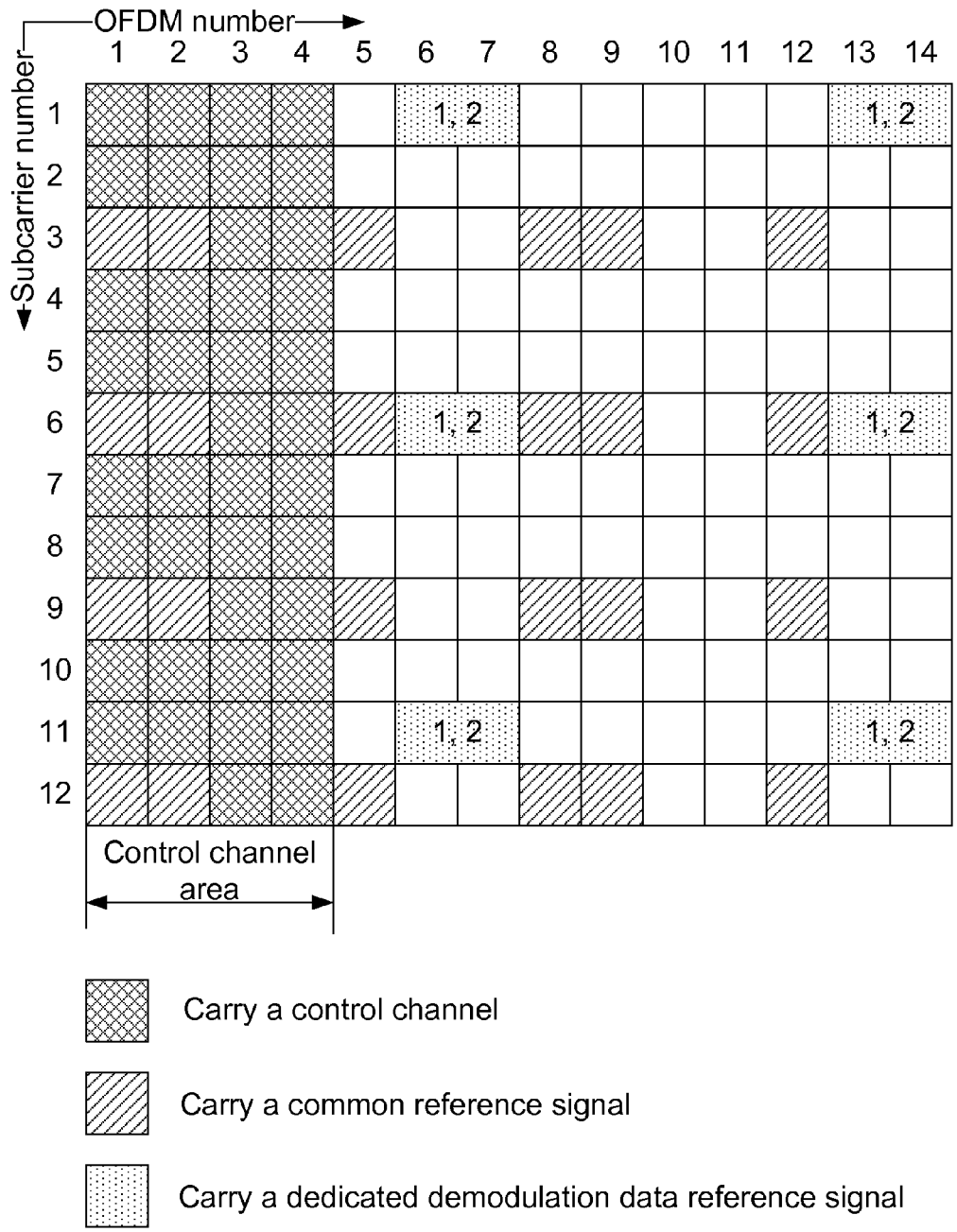
FIG. 3(A) shows a diagram of locations of dedicated demodulation data reference signals of the 1st type in an RB in the second embodiment of the disclosure.

FIG. 3(A) shows a diagram of locations of dedicated demodulation data reference signals of the 1st type in an RB. As shown in FIG. 3(A), all the dedicated demodulation data reference signals of the 1st type occupy 12 REs in the RB, whose locations in the RB can be represented by coordinates (x, y) as follows:
(6, 1) (7, 1) (13, 1) (14, 1)
(6, 6) (7, 6) (13, 6) (14, 6)
(6, 11) (7, 11) (13, 11) (14, 11).

Or, the locations of the dedicated demodulation data reference signals of the 1st type in the RB can also be represented by:

the 1st subcarrier on the 6th, 7th, 13th and 14th OFDM symbols;
the 6th subcarrier on the 6th, 7th, 13th and 14th OFDM symbols; and
the 11th subcarrier on the 6th, 7th, 13th and 14th OFDM symbols.

FIG. 3(B) shows a diagram of locations of dedicated demodulation data reference signals of the 2nd type in an RB. As shown in FIG. 3(B), all the dedicated demodulation data reference signals of the 2nd type occupy 24 REs in the RB, whose locations in the RB can be represented by coordinates (x, y) as follows:
(6, 1) (7, 1) (13, 1) (14, 1)
(6, 2) (7, 2) (13, 2) (14, 2)
(6, 6) (7, 6) (13, 6) (14, 6)
(6, 7) (7, 7) (13, 7) (14, 7)
(6, 11) (7, 11) (13, 11) (14, 11)
(6, 12) (7, 12) (13, 12) (14, 12);

or, the locations of the dedicated demodulation data reference signals of the 2nd type in an RB can also be represented by:

the 1st subcarrier on the 6th, 7th, 13th and 14th OFDM symbols;
the 2nd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 11th subcarrier on the 6th, 7th, 13th and 14th OFDM symbols; and
the 12th subcarrier on the 6th, 7th, 13th and 14th OFDM symbols.

In the 1st type, two adjacent REs perform the multiplexing using a two-order Walsh orthogonal code in a CDM way and correspond to dedicated demodulation data reference signals on two layers respectively.

In the 2nd type, 24 REs are classified into 6 groups each having 4 REs and the locations of the 6 groups in the RB can be represented by the following coordinates (x, y):

the 1st group: (6, 1) (7, 1) (6, 2) (7, 2);
the 2nd group: (13, 1) (14, 1) (13, 2) (14, 2);
The 3rd group: (6, 6) (7, 6) (6, 7) (7, 7);
the 4th group: (13, 6) (14, 6) (13, 7) (14, 7);
The 5th group: (6, 11) (7, 11) (6, 12) (7, 12); and
the 6th group: (13, 11) (14, 11) (13, 12) (14, 12).

Or, the 6 groups can also be represented by:
the 1st group: the 1st and 2nd subcarriers on the 6th and 7th OFDM symbols;
the 2nd group: the 1st and 2nd subcarriers on the 13th and 14th OFDM symbols;
the 3rd group: the 6th and 7th subcarriers on the 6th and 7th OFDM symbols;
the 4th group: the 6th and 7th subcarriers on the 13th and 14th OFDM symbols;
the 5th group: the 11th and 12th subcarriers on the 6th and 7th OFDM symbols; and
the 6th group: the 11th and 12th subcarriers on the 13th and 14th OFDM symbols, wherein the dedicated demodulation data reference signals corresponding to the 1st, 3rd, 5th and 7th (or 2nd, 4th, 6th and 8th) layers are carried in the 1st, 4th and 5th groups and subjected to the CDM using a four-order Walsh orthogonal code in the same group; and the dedicated demodulation data reference signals corresponding to the 2nd, 4th, 6th and 8th (or 1st, 3rd, 5th and 7th) layers are carried in the 2nd, 3rd and 6th groups and subjected to the CDM using a four-order Walsh orthogonal code in the same group, as shown in FIG. 3(A) and FIG. 3(B).

Third Embodiment

Layers are classified into two types according to the number of layers, i.e.: the 1st type if a total layer number is 1 or 2, and the 2nd type if a total layer number is more than 2.

Figure 4A:
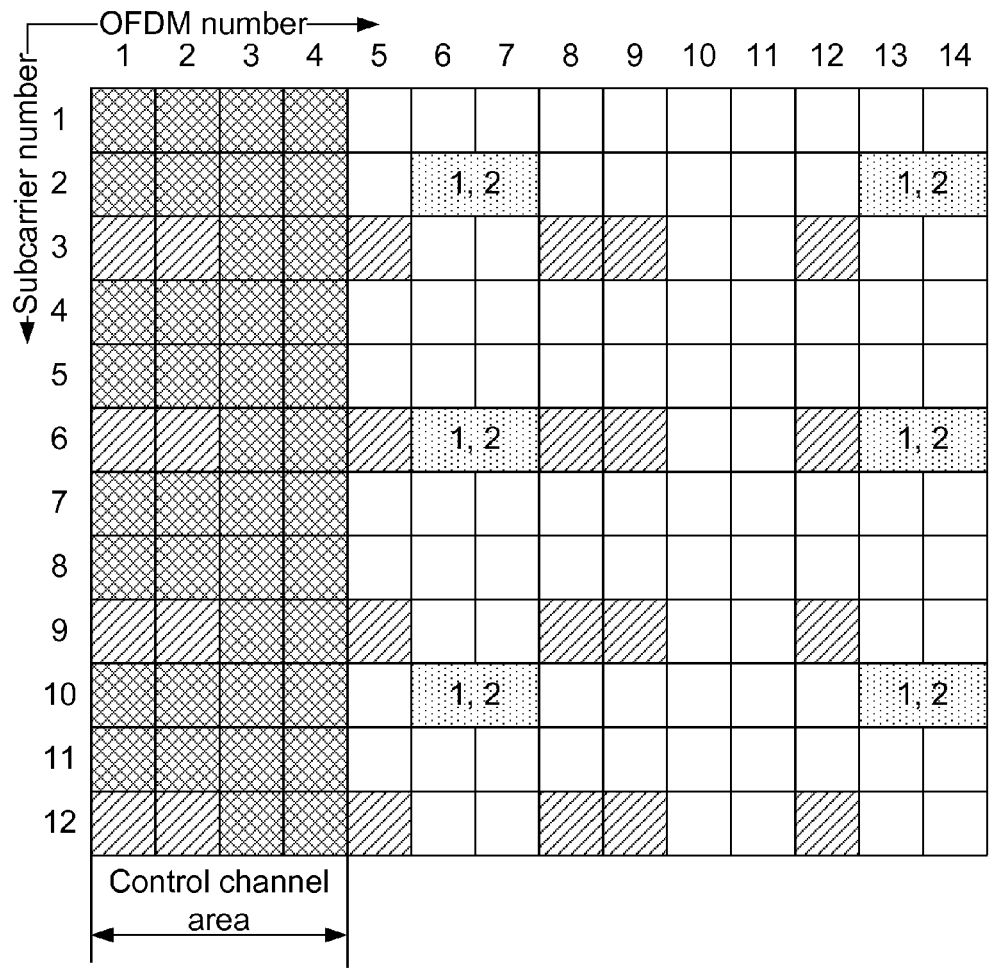
FIG. 4(A) shows a diagram of locations of dedicated demodulation data reference signals of the 1st type in an RB in the third embodiment of the disclosure.
Figure 4A:
Figure 4A:
Figure 4A:

FIG. 4(A) shows a diagram of locations of dedicated demodulation data reference signals of the 1st type in an RB. As shown in FIG. 4(A), all the dedicated demodulation data reference signals of the 1st type occupy 12 REs in the RB, whose locations in the RB can be represented by coordinates (x, y) as follows:

(6, 2) (7, 2) (13, 2) (14, 2)
(6, 6) (7, 6) (13, 6) (14, 6)
(6, 10) (7, 10) (13, 10) (14, 10);

or, the locations of the dedicated demodulation data reference signals of the 1st type in an RB can also be represented by:

the 2nd subcarrier on the 6th, 7th, 13th and 14th OFDM symbols;
the 6th subcarrier on the 6th, 7th, 13th and 14th OFDM symbols; and
the 10th subcarrier on the 6th, 7th, 13th and 14th OFDM symbols.

Figure 4B:
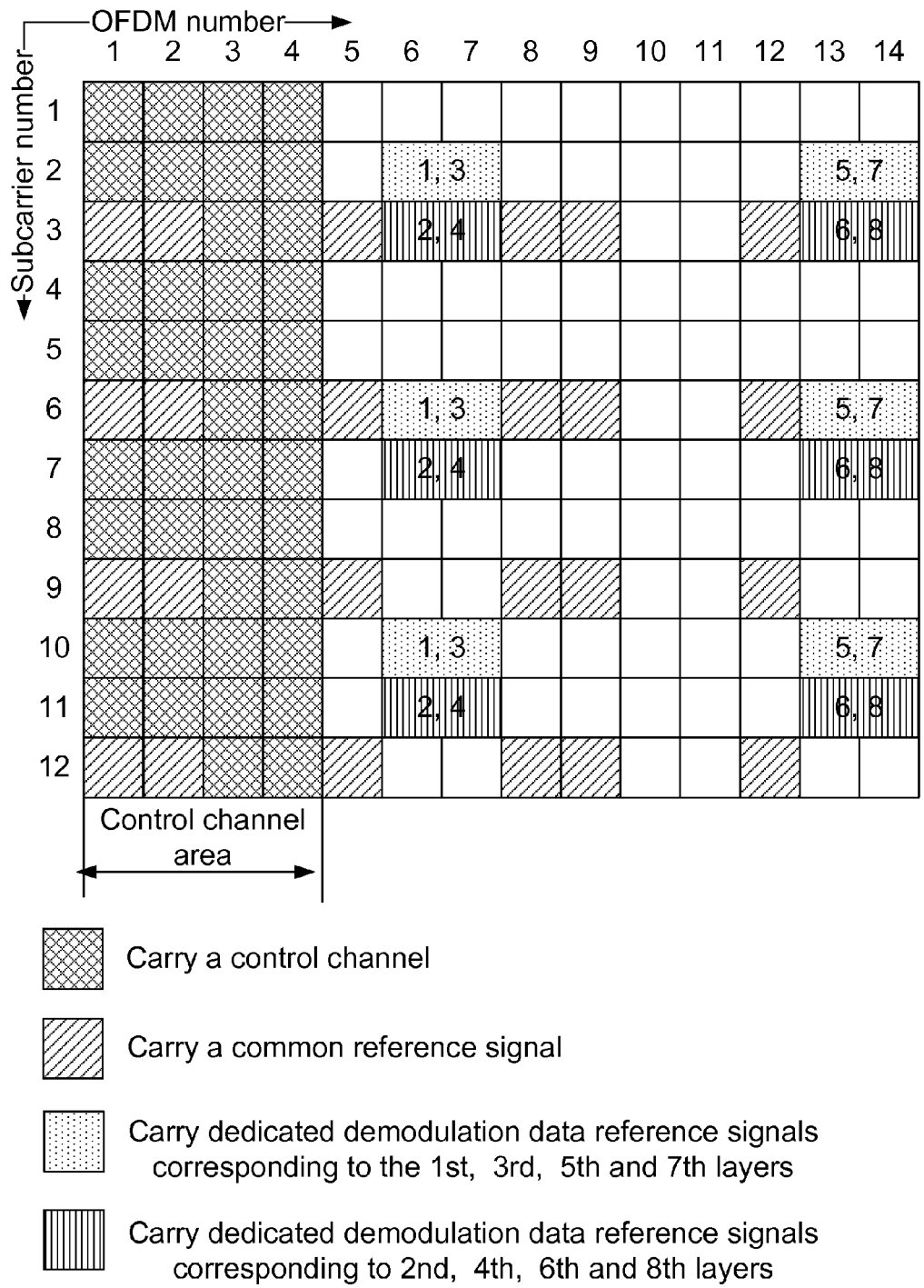
FIG. 4(B) shows a diagram of locations of dedicated demodulation data reference signals of the 2nd type in an RB in the third embodiment of the disclosure.

FIG. 4(B) shows a diagram of locations of dedicated demodulation data reference signals of the 2nd type in the RB. As shown in FIG. 4(B), all the dedicated demodulation data reference signals of the 2nd type occupy 24 REs in the RB, whose locations in the RB can be represented by coordinates (x, y) as follows:

(6, 2) (7, 2) (13, 2) (14, 2)
(6, 3) (7, 3) (13, 3) (14, 3)
(6, 6) (7, 6) (13, 6) (14, 6)
(6, 7) (7, 7) (13, 7) (14, 7)
(6, 10) (7, 10) (13, 10) (14, 10)
(6, 11) (7, 11) (13, 11) (14, 11);

or, the locations of the dedicated demodulation data reference signals of the 2nd type in an RB can also be represented by:

the 2nd subcarrier on the 6th, 7th, 13th and 14th OFDM symbols;
the 3rd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 10th subcarrier on the 6th, 7th, 13th and 14th OFDM symbols; and
the 11th subcarrier on the 6th, 7th, 13th and 14th OFDM symbols.

In the 1st type, two adjacent REs perform the multiplexing using a two-order Walsh orthogonal code in a CDM way and correspond to dedicated demodulation data reference signals on two layers respectively.

In the 2nd type, 24 REs are classified into 6 groups each having 4 REs and the locations of the 6 groups in the RB can be represented by the following coordinates (x, y):

the 1st group: (6, 2) (7, 2) (13, 2) (14, 2);
the 2nd group: (6, 3) (7, 3) (13, 3) (14, 3);
the 3rd group: (6, 6) (7, 6) (13, 6) (14, 6);
the 4th group: (6, 7) (7, 7) (13, 7) (14, 7);
the 5th group: (6, 10) (7, 10) (13, 10) (14, 10); and
the 6th group: (6, 11) (7, 11) (13, 11) (14, 11).

Or, the 6 groups can also be represented by:
the 1st group: the 2nd subcarrier on the 6th, 7th, 13th and 14th OFDM symbols;
the 2nd group: the 3rd subcarrier on the 6th, 7th, 13th and 14th OFDM symbols;
the 3rd group: the 6th subcarrier on the 6th, 7th, 13th and 14th OFDM symbols;
the 4th group: the 7th subcarrier on the 6th, 7th, 13th and 14th OFDM symbols;
the 5th group: the 10th subcarrier on the 6th, 7th, 13th and 14th OFDM symbols; and
the 6th group: the 11th subcarrier on the 6th, 7th, 13th and 14th OFDM symbols.

Or, in the 24 REs, 4 REs on the same subcarrier are classified into a group, wherein the dedicated demodulation data reference signals corresponding to the 1st, 3rd, 5th and 7th (or 2nd, 4th, 6th and 8th) layers are carried in the 1st, 3rd and 5th groups and subjected to the CDM using a four-order Walsh orthogonal code in the same group; and the dedicated demodulation data reference signals corresponding to the 2nd, 4th, 6th and 8th (or 1st, 3rd, 5th and 7th) layers are carried in the 2nd, 4th and 6th groups and subjected to the CDM using a four-order Walsh orthogonal code in the same group, as shown in FIG. 4(A) and FIG. 4(B), the locations of the dedicated demodulation data reference signals are represented by two graphs in FIG. 4(B): one representing the locations of the dedicated demodulation data reference signals corresponding to the 1st, 3rd, 5th and 7th layers and the other representing the dedicated demodulation data reference signals corresponding to the 2nd, 4th, 6th and 8th layers.

Fourth Embodiment

Layers are classified into 3 types according to the number of layers, i.e.: the 1st type if a total layer number is 1 or 2; the 2nd type if a total layer number is 3 or 4 and the 3rd type if a total layer number is more than 4.

Figure 5A:
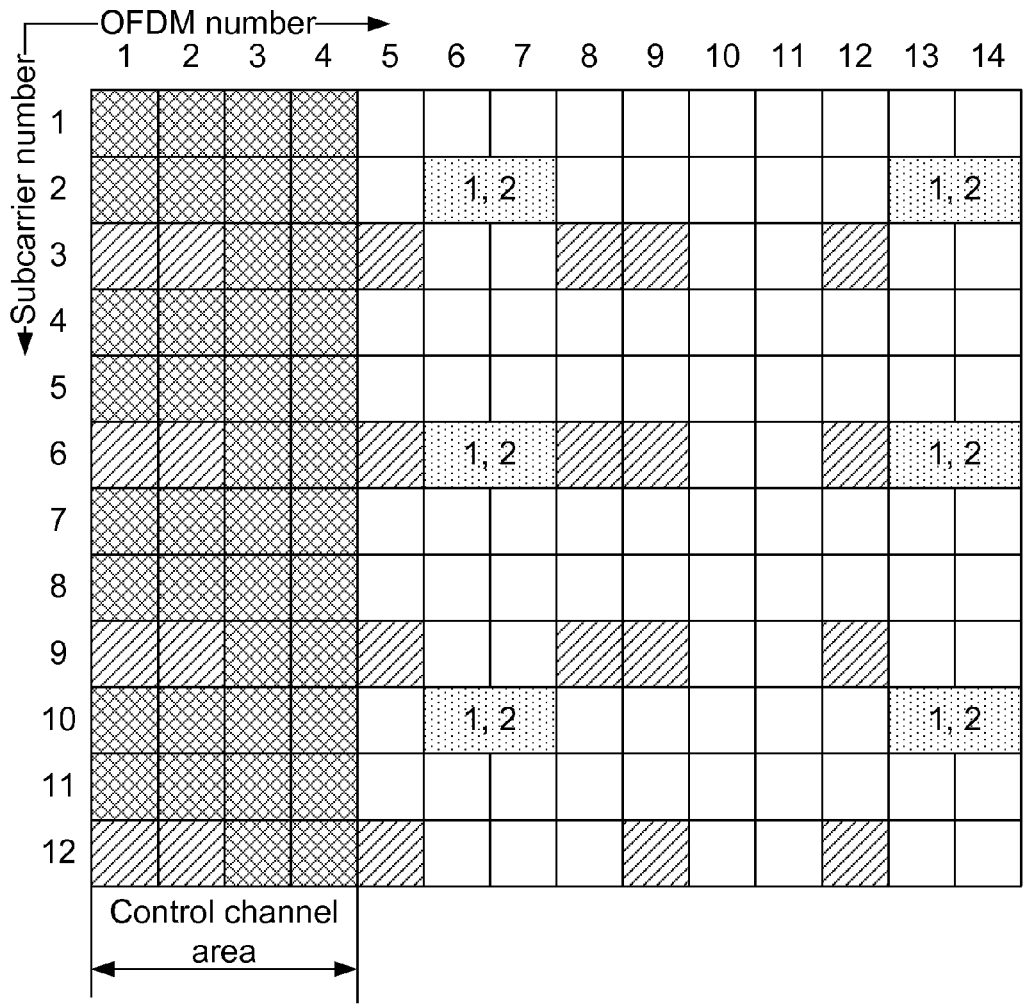
FIG. 5(A) shows a diagram of locations of dedicated demodulation data reference signals of the 1st type in an RB in the fourth embodiment of the disclosure.
Figure 5A:
Figure 5A:
Figure 5A:

FIG. 5(A) shows a diagram of locations of dedicated demodulation data reference signals of the 1st type in an RB. As shown in FIG. 5(A), all the dedicated demodulation data reference signals of the 1st type occupy 12 REs in the RB, whose locations in the RB can be represented by coordinates (x, y) as follows:

(6, 2) (7, 2) (13, 2) (14, 2)
(6, 6) (7, 6) (13, 6) (14, 6)
(6, 10) (7, 10) (13, 10) (14, 10);

or, the locations of the dedicated demodulation data reference signals of the 1st type in the RB can also be represented by:

the 2nd subcarrier on the 6th, 7th, 13th and 14th OFDM symbols;
the 6th subcarrier on the 6th, 7th, 13th and 14th OFDM symbols; and
the 10th subcarrier on the 6th, 7th, 13th and 14th OFDM symbols.

Figure 5B:
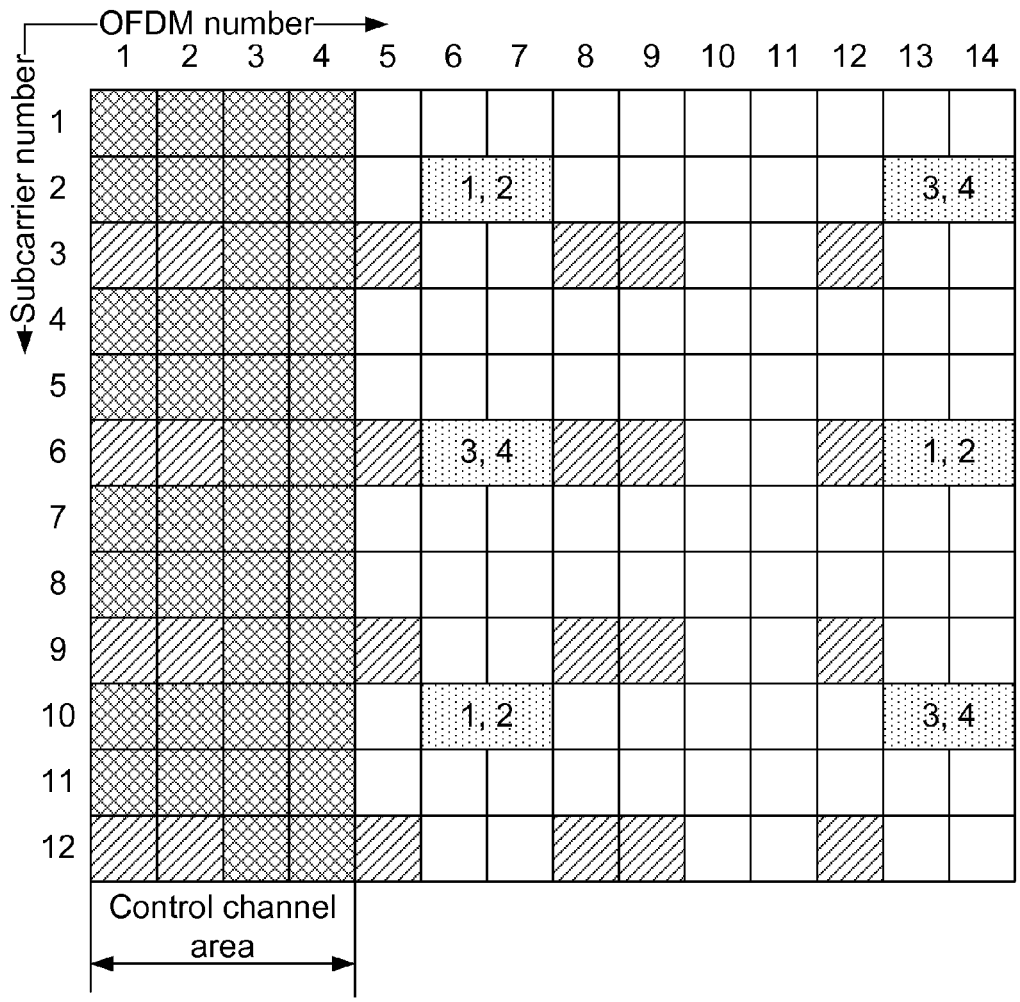
FIG. 5(B) shows a diagram of locations of dedicated demodulation data reference signals of the 2nd type in an RB in the fourth embodiment of the disclosure.
Figure 5B:
Figure 5B:
Figure 5B:

FIG. 5(B) shows a diagram of locations of dedicated demodulation data reference signals of the 2nd type in the RB. As shown in FIG. 5(B), all the dedicated demodulation data reference signals of the 2nd type occupy 12 REs in the RB, whose locations in the RB can be represented by coordinates (x, y) as follows:

(6, 2) (7, 2) (13, 2) (14, 2)
(6, 6) (7, 6) (13, 6) (14, 6)
(6, 10) (7, 10) (13, 10) (14, 10);

or, the locations of the dedicated demodulation data reference signals of the 2nd type in the RB can also be represented by:

the 2nd subcarrier on the 6th, 7th, 13th and 14th OFDM symbols;

the 6th subcarrier on the 6th, 7th, 13th and 14th OFDM symbols; and the 10th subcarrier on the 6th, 7th, 13th and 14th OFDM symbols.

Figure 5C:
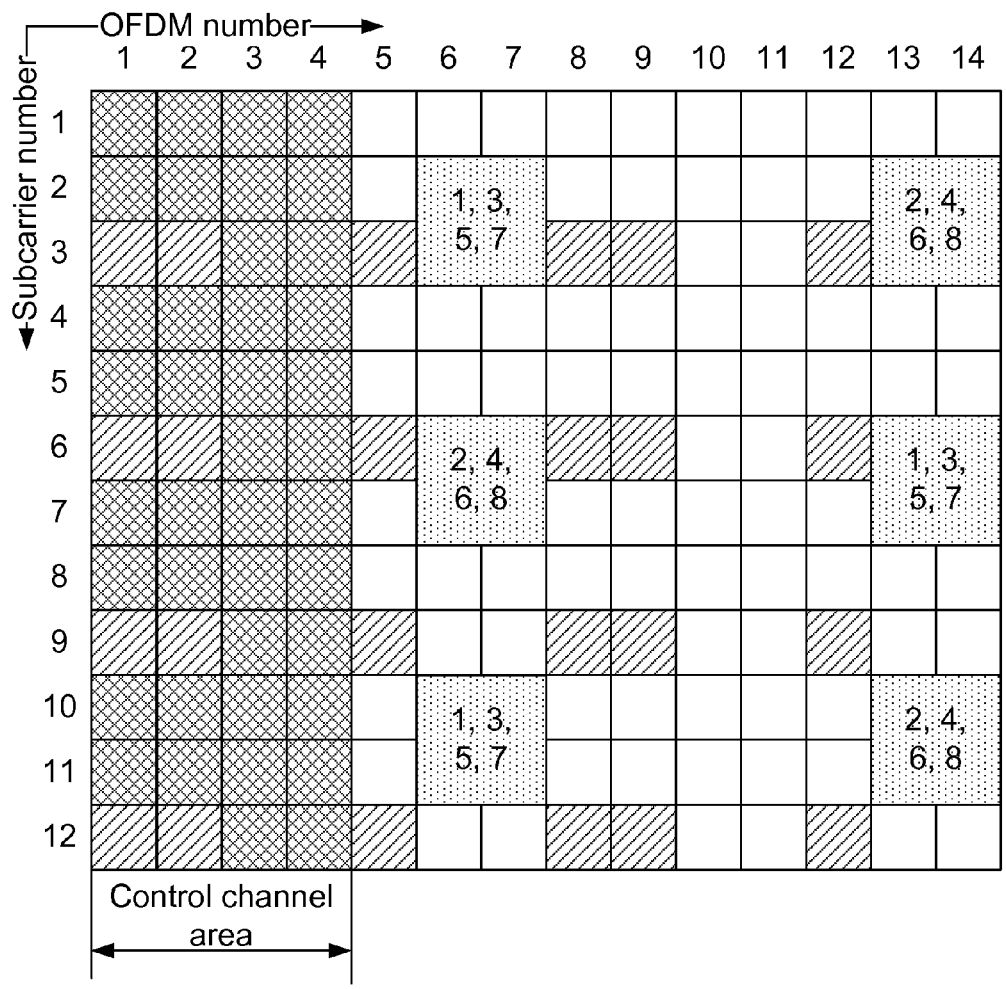
FIG. 5(C) shows a diagram of locations of dedicated demodulation data reference signals of the 3rd type in an RB in the fourth embodiment of the disclosure.

FIG. 5(C) shows a diagram of locations of dedicated demodulation data reference signals of the 3rd type in the RB. As shown in FIG. 5(C), all the dedicated demodulation data reference signals of the 3rd type occupy 24 REs in the RB, whose locations in the RB can be represented by coordinates (x, y) as follows:

(6, 2) (7, 2) (13, 2) (14, 2)
(6, 3) (7, 3) (13, 3) (14, 3)
(6, 6) (7, 6) (13, 6) (14, 6)
(6, 7) (7, 7) (13, 7) (14, 7)
(6, 10) (7, 10) (13, 10) (14, 10)
(6, 11) (7, 11) (13, 11) (14, 11);

or, the locations of the dedicated demodulation data reference signals of the 2nd type in an RB can also be represented by:

the 2nd subcarrier on the 6th, 7th, 13th and 14th OFDM symbols;

the 3rd subcarrier on the 6th, 7th, 13th and 14th OFDM symbols;

the 6th subcarrier on the 6th, 7th, 13th and 14th OFDM symbols;

the 7th subcarrier on the 6th, 7th, 13th and 14th OFDM symbols;

the 10th subcarrier on the 6th, 7th, 13th and 14th OFDM symbols; and the 11th subcarrier on the 6th, 7th, 13th and 14th OFDM symbols.

In the 1st type, two adjacent REs perform the multiplexing using a two-order Walsh orthogonal code in a CDM way and correspond to dedicated demodulation data reference signals on two layers respectively.

In the 2nd type, 12 REs are classified into 6 groups each having 2 REs and the locations of the 6 groups in the RB can be represented by the following coordinates (x, y):

the 1st group: (6, 2) (7, 2);
the 2nd group: (13, 2) (14, 2);
the 3rd group: (6, 6) (7, 6);
the 4th group: (13, 6) (14, 6);
the 5th group: (6, 10) (7, 10); and,
the 6th group: (13, 10) (14, 10).

Or, the 6 groups can also be represented by:

the 1st group: the 2nd subcarrier on the 6th and 7th OFDM symbols;

the 2nd group: the 2nd subcarrier on the 13th and 14th OFDM symbols;

the 3rd group: the 6th subcarrier on the 6th and 7th OFDM symbols;

the 4th group: the 6th subcarrier on the 13th and 14th OFDM symbols;

the 5th group: the 10th subcarrier on the 6th and 7th OFDM symbols; and, the 6th group: the 10th subcarrier on the 13th and 14th OFDM symbols, wherein the dedicated demodulation data reference signals corresponding to the 1st and 3rd (or 2nd and 4th) layers are carried in the 1st, 4th and 5th groups and subjected to the CDM using a two-order Walsh orthogonal code in the same group; and the dedicated demodulation data reference signals corresponding to the 2nd and 4th (or 1st and 3rd) layers are carried in the 2nd, 3rd and 6th groups and subjected to the CDM using a two-order Walsh orthogonal code in the same group.

In the 3rd type, 24 REs are classified into 6 groups each having 4 REs and the locations of the 6 groups in the RB can be represented by the following coordinates (x, y):

the 1st group: (6, 2) (7, 2) (6, 3) (7, 3);
the 2nd group: (13, 2) (14, 2) (13, 3) (14, 3);
the 3rd group: (6, 6) (7, 6) (6, 7) (7, 7);
the 4th group: (13, 6) (14, 6) (13, 7) (14, 7);
the 5th group: (6, 10) (7, 10) (6, 11) (7, 11); and
the 6th group: (13, 10) (14, 10) (13, 11) (14, 11).

Or, the 6 groups can also be represented by:

the 1st group: the 2nd and 3rd subcarriers on the 6th and 7th OFDM symbols;

the 2nd group: the 2nd and 3rd subcarriers on the 13th and 14th OFDM symbols;

the 3rd group: the 6th and 7th subcarriers on the 6th and 7th OFDM symbols;

the 4th group: the 6th and 7th subcarriers on the 13th and 14th OFDM symbols;

the 5th group: the 10th and 11th subcarriers on the 6th and 7th OFDM symbols; and the 6th group: the 10th and 11th subcarriers on the 13th and 14th OFDM symbols, wherein the dedicated demodulation data reference signals corresponding to the 1st, 3rd, 5th and 7th (or 2nd, 4th, 6th and 8th) layers are carried in the 1st, 4th and 5th groups and subjected to the CDM using a four-order Walsh orthogonal code in the same group; and the dedicated demodulation data reference signals corresponding to the 2nd, 4th, 6th and 8th (or 1st, 3rd, 5th and 7th) layers are carried in the 2nd, 3rd and 6th groups and subjected to the CDM using a four-order Walsh orthogonal code in the same group, as shown in FIG. 5(A), FIG. 5(B) and FIG. 5(C).

Fifth Embodiment

Layers are classified into 3 types according to the number of layers, i.e.: the 1st type if a total layer number is 1 or 2, the 2nd type if a total layer number is 3 or 4 and the 3rd type if a total layer number is more than 4.

Figure 6A:
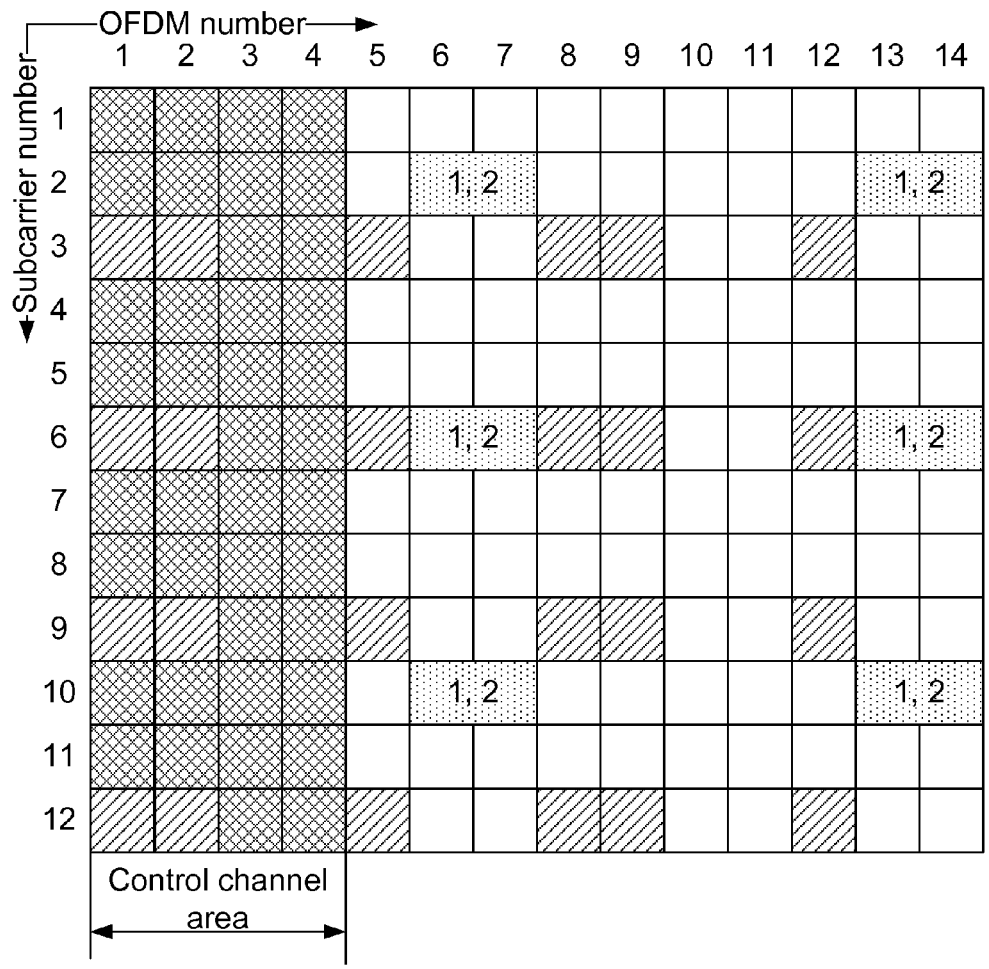
FIG. 6(A) shows a diagram of locations of dedicated demodulation data reference signals of the 1st type in an RB in the fifth embodiment of the disclosure.

FIG. 6(A) shows a diagram of locations of dedicated demodulation data reference signals of the 1st type in an RB. As shown in FIG. 6(A), all the dedicated demodulation data reference signals of the 1st type occupy 12 REs in the RB, whose locations in the RB can be represented by coordinates (x, y) as follows:

(6, 2) (7, 2) (13, 2) (14, 2)
(6, 6) (7, 6) (13, 6) (14, 6)
(6, 10) (7, 10) (13, 10) (14, 10);

or, the locations of the dedicated demodulation data reference signals of the 1st type in the RB can also be represented by:

the 2nd subcarrier on the 6th, 7th, 13th and 14th OFDM symbols;

the 6th subcarrier on the 6th, 7th, 13th and 14th OFDM symbols; and the 10th subcarrier on the 6th, 7th, 13th and 14th OFDM symbols.

Figure 6B:
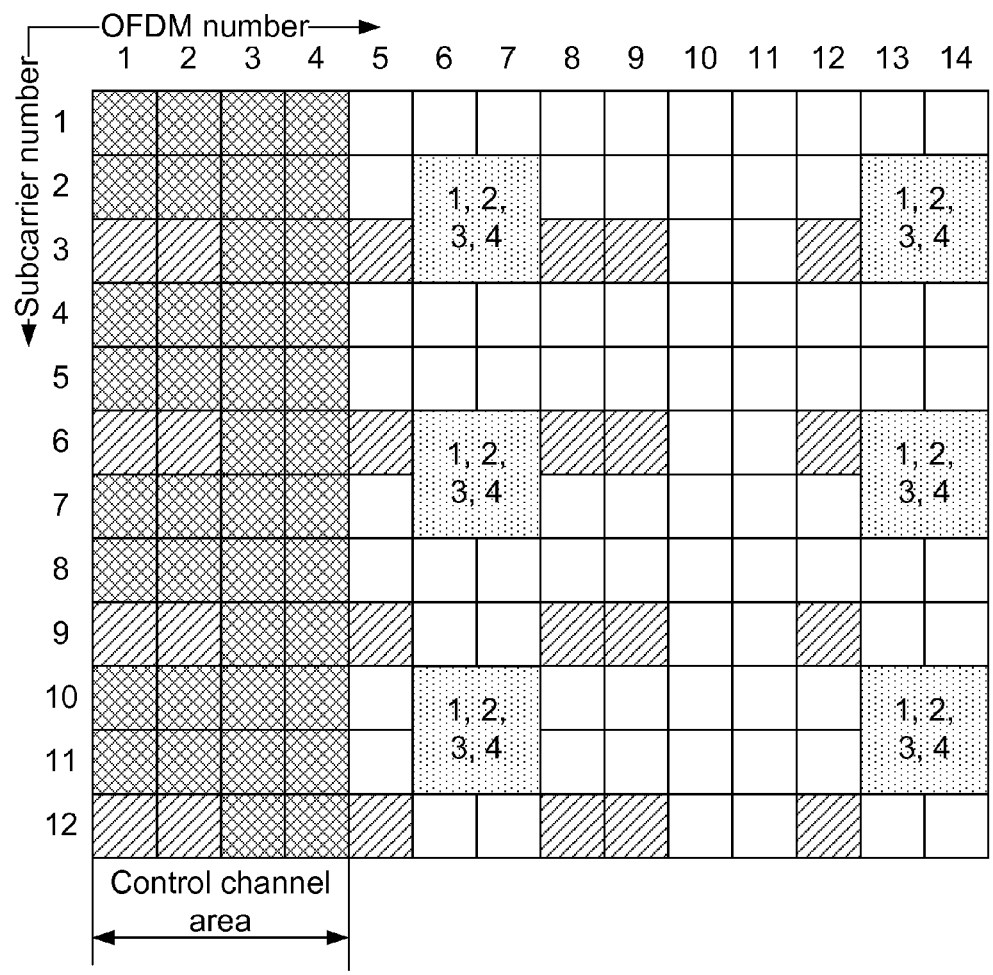
FIG. 6(B) shows a diagram of locations of dedicated demodulation data reference signals of the 2nd type in an RB in the fifth embodiment of the disclosure.

FIG. 6(B) shows a diagram of locations of dedicated demodulation data reference signals of the 2nd type in the RB. As shown in FIG. 6(B), all the dedicated demodulation data reference signals of the 2nd type occupy 24 REs in the RB, whose locations in the RB can be represented by coordinates (x, y) as follows:

(6, 2) (7, 2) (13, 2) (14, 2)
(6, 3) (7, 3) (13, 3) (14, 3)
(6, 6) (7, 6) (13, 6) (14, 6)
(6, 7) (7, 7) (13, 7) (14, 7)
(6, 10) (7, 10) (13, 10) (14, 10)
(6, 11) (7, 11) (13, 11) (14, 11);

or, the locations of the dedicated demodulation data reference signals of the 2nd type in the RB can also be represented by:

the 2nd subcarrier on the 6th, 7th, 13th and 14th OFDM symbols;
the 3rd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 10th subcarrier on the 6th, 7th, 13th and 14th OFDM symbols; and
the 11th subcarrier on the 6th, 7th, 13th and 14th OFDM symbols.

FIG. 6(C) shows a diagram of locations of dedicated demodulation data reference signals of the 3rd type in the RB. As shown in FIG. 6(C), all the dedicated demodulation data reference signals of the 3rd type occupy 24 REs in the RB, whose locations in the RB can be represented by coordinates (x, y) as follows:

(6, 2) (7, 2) (13, 2) (14, 2)
(6, 3) (7, 3) (13, 3) (14, 3)
(6, 6) (7, 6) (13, 6) (14, 6)
(6, 7) (7, 7) (13, 7) (14, 7)
(6, 10) (7, 10) (13, 10) (14, 10)
(6, 11) (7, 11) (13, 11) (14, 11);

or, the locations of the dedicated demodulation data reference signals of the 3rd type in the RB can also be represented by:

the 2nd subcarrier on the 6th, 7th, 13th and 14th OFDM symbols;
the 3rd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 10th subcarrier on the 6th, 7th, 13th and 14th OFDM symbols; and
the 11th subcarrier on the 6th, 7th, 13th and 14th OFDM symbols.

In the 1st type, two adjacent REs perform the multiplexing using a two-order Walsh orthogonal code in a CDM way and correspond to dedicated demodulation data reference signals on two layers respectively.

In the 2nd type, four adjacent REs perform the multiplexing using a four-order Walsh orthogonal code in a CDM way and correspond to dedicated demodulation data reference signals on four layers respectively.

In the 3rd type, 24 REs are classified into 6 groups each having 4 REs and the locations of the 6 groups in the RB can be represented by the following coordinates (x, y):

the 1st group: (6, 2) (7, 2) (6, 3) (7, 3);
the 2nd group: (13, 2) (14, 2) (13, 3) (14, 3);
the 3rd group: (6, 6) (7, 6) (6, 7) (7, 7);
the 4th group: (13, 6) (14, 6) (13, 7) (14, 7);
the 5th group: (6, 10) (7, 10) (6, 11) (7, 11); and
the 6th group: (13, 10) (14, 10) (13, 11) (14, 11).

Or, the 6 groups can also be represented by:
the 1st group: the 2nd and 3rd subcarriers on the 6th and 7th OFDM symbols;
the 2nd group: the 2nd and 3rd subcarriers on the 13th and 14th OFDM symbols;
the 3rd group: the 6th and 7th subcarriers on the 6th and 7th OFDM symbols;
the 4th group: the 6th and 7th subcarriers on the 13th and 14th OFDM symbols;
the 5th group: the 10th and 11th subcarriers on the 6th and 7th OFDM symbols; and
the 6th group: the 10th and 11th subcarriers on the 13th and 14th OFDM symbols, wherein the dedicated demodulation data reference signals corresponding to the 1st, 3rd, 5th and 7th (or 2nd, 4th, 6th and 8th) layers are carried in the 1st, 4th and 5th groups and subjected to the CDM using a four-order Walsh orthogonal code in the same group; and the dedicated demodulation data reference signals corresponding to the 2nd, 4th, 6th and 8th (or 1st, 3rd, 5th and 7th) layers are carried in the 2nd, 3rd and 6th groups and subjected to the CDM using a four-order Walsh orthogonal code in the same group, as shown in FIG. 6(A), FIG. 6(B) and FIG. 6(C).

Sixth Embodiment

In the embodiment, layers are classified into two types according to the number of layers, i.e.: the 1st type if a total layer number is 1 or 2 and the 2nd type if a total layer number is more than 2.

Figure 7A:
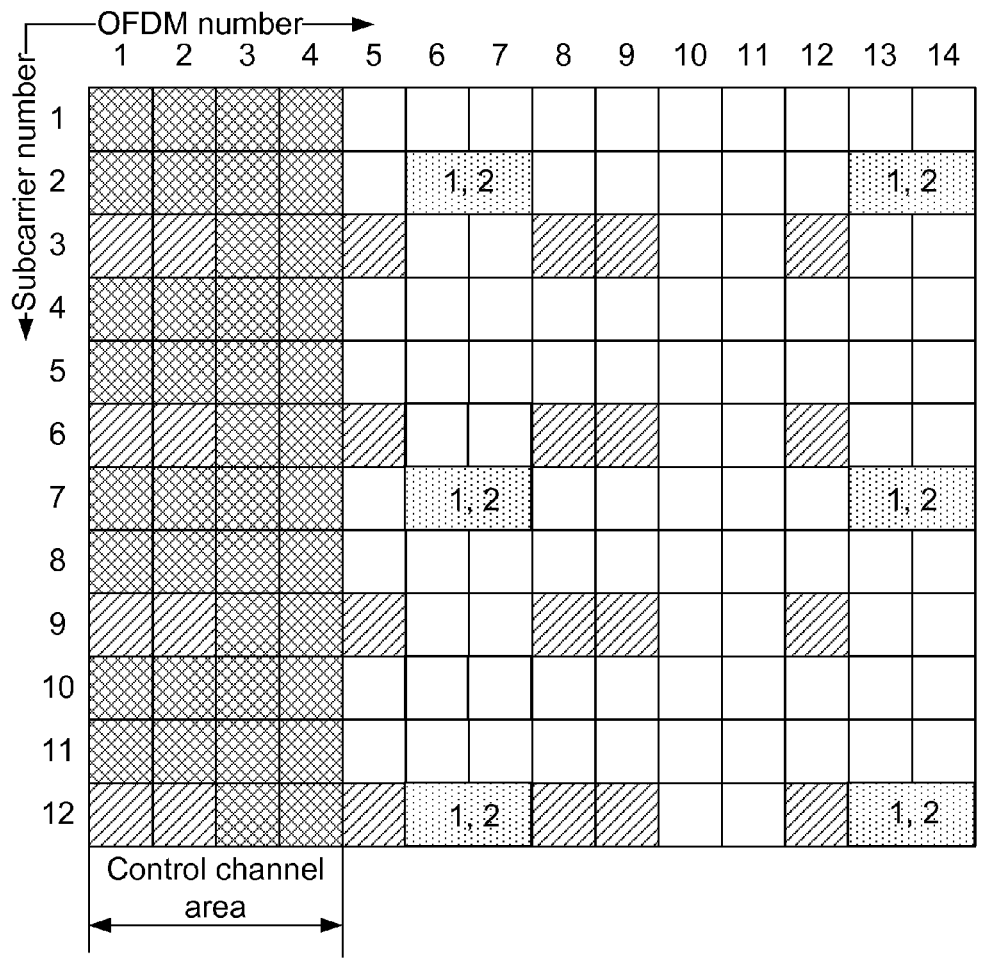
FIG. 7(A) shows a diagram of locations of dedicated demodulation data reference signals of the 1st type in an RB in the sixth embodiment of the disclosure.

FIG. 7(A) shows a diagram of locations of dedicated demodulation data reference signals of the 1st type in an RB. As shown in FIG. 7(A), all the dedicated demodulation data reference signals of the 1st type occupy 12 REs in the RB, whose locations in the RB can be represented by coordinates (x, y) as follows:

(6, 2) (7, 2) (13, 2) (14, 2)
(6, 7) (7, 7) (13, 7) (14, 7)
(6, 12) (7, 12) (13, 12) (14, 12);

wherein x represents an OFDM symbol index in the RB and y represents a subcarrier index in the RB.

Or, the locations of the dedicated demodulation data reference signals of the 1st type in the RB can also be represented by:

the 2nd subcarrier on the 6th, 7th, 13th and 14th OFDM symbols;
the 7th subcarrier on the 6th, 7th, 13th and 14th OFDM symbols; and
the 12th subcarrier on the 6th, 7th, 13th and 14th OFDM symbols.

FIG. 7(B) shows a diagram of locations of dedicated demodulation data reference signals of the 2nd type in the RB. As shown in FIG. 7(B), all the dedicated demodulation data reference signals of the 2nd type occupy 24 REs in the RB, whose locations in the RB can be represented by coordinates (x, y) as follows:

(6, 1) (7, 1) (13, 1) (14, 1)
(6, 2) (7, 2) (13, 2) (14, 2)
(6, 6) (7, 6) (13, 6) (14, 6)
(6, 7) (7, 7) (13, 7) (14, 7)
(6, 11) (7, 11) (13, 11) (14, 11)
(6, 12) (7, 12) (13, 12) (14, 12).

Or, the locations of the dedicated demodulation data reference signals of the 2nd type in the RB can also be represented by:

the 1st subcarrier on the 6th, 7th, 13th and 14th OFDM symbols;

the 2nd subcarrier on the 6th, 7th, 13th and 14th OFDM symbols;

the 6th subcarrier on the 6th, 7th, 13th and 14th OFDM symbols;

the 7th subcarrier on the 6th, 7th, 13th and 14th OFDM symbols;

the 11th subcarrier on the 6th, 7th, 13th and 14th OFDM symbols; and the 12th subcarrier on the 6th, 7th, 13th and 14th OFDM symbols.

In the 1st type, two adjacent REs perform the multiplexing by a two-order Walsh orthogonal code in a CDM way and correspond to dedicated demodulation data reference signals on two layers respectively.

In the 2nd type, 24 REs are classified into 6 groups each having 4 REs and the locations of the 6 groups in the RB can be represented by the following coordinates (x, y):

the 1st group: (6, 1) (7, 1) (13, 1) (14, 1);
the 2nd group: (6, 2) (7, 2) (13, 2) (14, 2);
the 3rd group: (6, 6) (7, 6) (13, 6) (14, 6);
the 4th group: (6, 7) (7, 7) (13, 7) (14, 7);
the 5th group: (6, 11) (7, 11) (13, 11) (14, 11); and
the 6th group: (6, 12) (7, 12) (13, 12) (14, 12).

Or, the 6 groups can also be represented by:

the 1st group: the 1st subcarrier on the 6th, 7th, 13th and 14th OFDM symbols;

the 2nd group: the 2nd subcarrier on the 6th, 7th, 13th and 14th OFDM symbols;

the 3rd group: the 6th subcarrier on the 6th, 7th, 13th and 14th OFDM symbols;

the 4th group: the 7th subcarrier on the 6th, 7th, 13th and 14th OFDM symbols;

the 5th group: the 11th subcarrier on the 6th, 7th, 13th and 14th OFDM symbols; and the 6th group: the 12th subcarrier on the 6th, 7th, 13th and 14th OFDM symbols, wherein the dedicated demodulation data reference signals corresponding to the 1st, 2nd, 5th and 7th layers are carried in the 2nd, 4th and 6th groups and subjected to the CDM using a four-order Walsh orthogonal code in the same group; and the dedicated demodulation data reference signals corresponding to the 3rd, 4th, 6th and 8th layers are carried in the 1st, 3rd and 5th groups and subjected to the CDM using a four-order Walsh orthogonal code in the same group, as shown in FIG. 7(A) and FIG. 7(B).

Although the embodiments are described as above, their contents are only for the understanding the disclosure rather than limiting the disclosure. Any one of those skilled in the art can make any modification and variation on the implementing ways and details without departing from the spirit and scope of the disclosure; for example, the system applied by the disclosure is not limited to the LTE-A system, however, the patent protection scope of the disclosure is still defined by the scope of the accompanied claims.

INDUSTRIAL APPLICABILITY

The method defined on a layer for determining resources for dedicated demodulation data reference signals uses a few signallings and modes, is convenient to be implemented by hardware and transparent to an MU-MIMO receiving end (including MU-MIMO in CoMP), and can fully use transmission power.

What is claimed is:

1. A signal resource determination method, comprising:
carrying a dedicated demodulation data reference signal in a Resource Element (RE) on an Orthogonal Frequency Division Multiplexing (OFDM) symbol, wherein the OFDM symbol is in a non-control channel area of a Resource Block (RB) and carries a non-common reference signal, wherein before the step of carrying the dedicated demodulation data reference signal, classifying different number of layers and determining locations of the dedicated demodulation data reference signals for different types of the layers respectively.

2. The signal resource determination method according to claim 1, wherein the OFDM symbol which is in a non-control channel area of a Resource Block (RB) and carries an non-common reference signal comprises: 6th, 7th, 10th, 11th, 13th and 14th OFDM symbols of each subcarrier in the resource block.

3. The signal resource determination method according to claim 1, wherein the step of classifying different number of layers comprises:

classifying the different number of layers into two types: a first type if a total layer number is 1 or 2; and a second type if a total layer number is more than 2;

or, classifying the different number of layers into 3 types: a first type if a total layer number is 1 or 2; a second type if a total layer number is 3 or 4; and a third type if a total layer number is more than 4;

wherein the dedicated demodulation data reference signals on different layers of the same type have the same overhead; and relative two-dimension time-frequency locations of REs occupied by the dedicated demodulation data reference signals of the same type are in a same, translational or symmetrical relationship.

4. The signal resource determination method according to claim 3, wherein the step of classifying different number of layers further comprises:

when classifying the different number of layers into 2 types, dedicated demodulation data reference signals on all the layers of the 1st type have a total overhead of 12 REs; and dedicated demodulation data reference signals on all the layers of the 2nd type have a total overhead of 24 REs; or when classifying the different number of layers into 3 types, dedicated demodulation data reference signals on all the layers of the 1st type have a total overhead of 12 REs; dedicated demodulation data reference signals on all the layers of the 2nd type have a total overhead of 12 or 24 REs and dedicated demodulation data reference signals on all the layers of the 3rd type have a total overhead of 24 REs.

5. The signal resource determination method according to claim 3, wherein the step of classifying different number of layers further comprises:

multiplexing the dedicated demodulation data reference signals on different layers of the same type in a code division multiplexing way, wherein an orthogonal code used here is a Walsh orthogonal code and an order number of the code division multiplexing is the power of 2.

6. The signal resource determination method according to claim 5, wherein a length of each orthogonal code is equal to the order number of the code division multiplexing and a number of the occupied REs.

7. The signal resource determination method according to claim 6, wherein the step of classifying different number of layers further comprises: increasing power of dedicated demodulation data reference signals on each layer when the number of actually used layers is less than the order number of the code division multiplexing of the same type.

8. The signal resource determination method according to claim 6, wherein
an index of the dedicated demodulation data reference signal is a physical resource of the dedicated demodulation data reference signal on the layer which is uniquely determined by the type and an orthogonal code index.

9. The signal resource determination method according to claim 4, wherein in the step of classifying different numbers of layers, when the different number of layers are classified into two types,
the locations of the dedicated demodulation data reference signals of the 1st type in the RB are:
a 2nd subcarrier on the 6th, 7th, 13th and 14th OFDM symbols;
a 6th subcarrier on the 6th, 7th, 13th and 14th OFDM symbols; and
a 10th subcarrier on the 6th, 7th, 13th and 14th OFDM symbols;
or,
the 2nd subcarrier on the 6th, 7th, 13th and 14th OFDM symbols;
a 7th subcarrier on the 6th, 7th, 13th and 14th OFDM symbols; and
a 12th subcarrier on the 6th, 7th, 13th and 14th OFDM symbols;
and,
the locations of the dedicated demodulation data reference signals of the 2nd type in the RB are:
the 2nd subcarrier on the 6th, 7th, 13th and 14th OFDM symbols;
a 3rd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 10th subcarrier on the 6th, 7th, 13th and 14th OFDM symbols; and
a 11th subcarrier on the 6th, 7th, 13th and 14th OFDM symbols;
or,
a 1st subcarrier on the 6th, 7th, 13th and 14th OFDM symbols;
the 2nd subcarrier on the 6th, 7th, 13th and 14th OFDM symbols;
the 6th subcarrier on the 6th, 7th, 13th and 14th OFDM symbols;
the 7th subcarrier on the 6th, 7th, 13th and 14th OFDM symbols;
the 11th subcarrier on the 6th, 7th, 13th and 14th OFDM symbols; and
the 12th subcarrier on the 6th, 7th, 13th and 14th OFDM symbols.

10. The signal resource determination method according to claim 9, wherein in the step of classifying different number of layers, when classifying the different number of layers into two types,
in the 1st type, two adjacent REs perform the code division multiplexing using a two-order Walsh orthogonal code and correspond to dedicated demodulation data reference signals on two layers respectively;
24 REs of the 2nd type are classified into 6 groups each having 4 REs, wherein a 1st group includes the 2nd and 3rd subcarriers on the 6th and 7th OFDM symbols;
a 2nd group includes the 2nd and 3rd subcarriers on the 13th and 14th OFDM symbols;
a 3rd group includes the 6th and 7th subcarriers on the 6th and 7th OFDM symbols;
a 4th group includes the 6th and 7th subcarriers on the 13th and 14th OFDM symbols;
a 5th group includes the 10th and 11th subcarriers on the 6th and 7th OFDM symbols; and
a 6th group includes the 10th and 11th subcarriers on the 13th and 14th OFDM symbols;
or,
the 1st group includes the 2nd subcarrier on the 6th, 7th, 13th and 14th OFDM symbols;
the 2nd group includes the 3rd subcarrier on the 6th, 7th, 13th and 14th OFDM symbols;
the 3rd group includes the 6th subcarrier on the 6th, 7th, 13th and 14th OFDM symbols;
the 4th group includes the 7th subcarrier on the 6th, 7th, 13th and 14th OFDM symbols;
the 5th group includes the 10th subcarrier on the 6th, 7th, 13th and 14th OFDM symbols; and
the 6th group includes the 11th subcarrier on the 6th, 7th, 13th and 14th OFDM symbols;
or,
the 1st group includes the 1st subcarrier on the 6th, 7th, 13th and 14th OFDM symbols;
the 2nd group includes the 2nd subcarrier on the 6th, 7th, 13th and 14th OFDM symbols;
the 3rd group includes the 6th subcarrier on the 6th, 7th, 13th and 14th OFDM symbols;
the 4th group includes the 7th subcarrier on the 6th, 7th, 13th and 14th OFDM symbols;
the 5th group includes the 11th subcarrier on the 6th, 7th, 13th and 14th OFDM symbols; and
the 6th group includes the 12th subcarrier on the 6th, 7th, 13th and 14th OFDM symbols;
dedicated demodulation data reference signals corresponding to the 1st, 3rd, 5th and 7th layers are carried in the 1st, 4th and 5th groups; and dedicated demodulation data reference signals corresponding to the 2nd, 4th, 6th and 8th layers are carried in the 2nd, 3rd and 6th groups; or,
dedicated demodulation data reference signals corresponding to the 1st, 3rd, 5th and 7th layers are carried in the 2nd, 3rd and 6th groups; and dedicated demodulation data reference signals corresponding to the 2nd, 4th, 6th and 8th layers are carried in the 1st, 4th and 5th groups; or,
dedicated demodulation data reference signals corresponding to the 1st, 2nd, 5th and 7th layers are carried in the 2nd, 4th and 6th groups; and dedicated demodulation data reference signals corresponding to the 3rd, 4th, 6th and 8th layers are carried in the 1st, 3rd and 5th groups; and
dedicated demodulation data reference signals corresponding to 4 layers in the same group are subjected to the code division multiplexing using a four-order Walsh orthogonal code.

11. The signal resource determination method according to claim 4, wherein in the step of classifying different number of layers, when classifying the different number of layers into two types,
the locations of the dedicated demodulation data reference signals of the 1st type in the RB are:

a 1st subcarrier on the 6th, 7th, 13th and 14th OFDM symbols;
a 6th subcarrier on the 6th, 7th, 13th and 14th OFDM symbols; and
a 11th subcarrier on the 6th, 7th, 13th and 14th OFDM symbols;
and,
the locations of the dedicated demodulation data reference signals of the 2nd type in the RB are:
the 1st subcarrier on the 6th, 7th, 13th and 14th OFDM symbols;
a 2nd subcarrier on the 6th, 7th, 13th and 14th OFDM symbols;
the 6th subcarrier on the 6th, 7th, 13th and 14th OFDM symbols;
a 7th subcarrier on the 6th, 7th, 13th and 14th OFDM symbols;
the 11th subcarrier on the 6th, 7th, 13th and 14th OFDM symbols; and
a 12th subcarrier on the 6th, 7th, 13th and 14th OFDM symbols.

12. The signal resource determination method according to claim 11, wherein in the step of classifying different number of layers, when classifying the different number of layers into two types,
  in the 1st type, two adjacent REs perform the code division multiplexing using a two-order Walsh orthogonal code and correspond to dedicated demodulation data reference signals on two layers respectively;
  24 REs of the 2nd type are classified into 6 groups each having 4 REs, wherein
  a 1st group includes the 1st and 2nd subcarriers on the 6th and 7th OFDM symbols;
  a 2nd group includes the 1st and 2nd subcarriers on the 13th and 14th OFDM symbols;
  a 3rd group includes the 6th and 7th subcarriers on the 6th and 7th OFDM symbols;
  a 4th group includes the 6th and 7th subcarriers on the 13th and 14th OFDM symbols;
  a 5th group includes the 11th and 12th subcarriers on the 6th and 7th OFDM symbols; and
  a 6th group includes the 11th and 12th subcarriers on the 13th and 14th OFDM symbols;
  dedicated demodulation data reference signals corresponding to the 1st, 3rd, 5th and 7th layers are carried in the 1st, 4th and 5th groups; and dedicated demodulation data reference signals corresponding to the 2nd, 4th, 6th and 8th layers are carried in the 2nd, 3rd and 6th groups; or,
  dedicated demodulation data reference signals corresponding to the 1st, 3rd, 5th and 7th layers are carried in the 2nd, 3rd and 6th groups; and dedicated demodulation data reference signals corresponding to the 2nd, 4th, 6th and 8th layers are carried in the 1st, 4th and 5th groups; and
  dedicated demodulation data reference signals corresponding to 4 layers in the same group are subjected to the code division multiplexing using a four-order Walsh orthogonal code.

13. The signal resource determination method according to claim 4, wherein in the step of classifying different number of layers, when classifying the different number of layers into three types,
  the locations of the dedicated demodulation data reference signals of the 1st type in the RB are:
  a 2nd subcarrier on the 6th, 7th, 13th and 14th OFDM symbols;
  a 6th subcarrier on the 6th, 7th, 13th and 14th OFDM symbols; and
  a 10th subcarrier on the 6th, 7th, 13th and 14th OFDM symbols;
  corresponding locations of the dedicated demodulation data reference signals of the 2nd type which occupy 12 REs in the RB are:
  the 2nd subcarrier on the 6th, 7th, 13th and 14th OFDM symbols;
  the 6th subcarrier on the 6th, 7th, 13th and 14th OFDM symbols; and
  the 10th subcarrier on the 6th, 7th, 13th and 14th OFDM symbols;
  corresponding locations of the dedicated demodulation data reference signals of the 2nd type which occupy 24 REs in the RB are:
  the 2nd subcarrier on the 6th, 7th, 13th and 14th OFDM symbols;
  a 3rd subcarrier on the 6th, 7th, 13th and 14th OFDM symbols;
  the 6th subcarrier on the 6th, 7th, 13th and 14th OFDM symbols;
  a 7th subcarrier on the 6th, 7th, 13th and 14th OFDM symbols;
  the 10th subcarrier on the 6th, 7th, 13th and 14th OFDM symbols; and
  a 11th subcarrier on the 6th, 7th, 13th and 14th OFDM symbols;
  and,
  locations of the dedicated demodulation data reference signals of the 3rd type in the RB are:
  the 2nd subcarrier on the 6th, 7th, 13th and 14th OFDM symbols;
  the 3rd subcarrier on the 6th, 7th, 13th and 14th OFDM symbols;
  the 6th subcarrier on the 6th, 7th, 13th and 14th OFDM symbols;
  the 7th subcarrier on the 6th, 7th, 13th and 14th OFDM symbols;
  the 10th subcarrier on the 6th, 7th, 13th and 14th OFDM symbols; and
  the 11th subcarrier on the 6th, 7th, 13th and 14th OFDM symbols.

14. The signal resource determination method according to claim 13, wherein in the step of ifying different number of layers, when classifying the different number of layers into three types,
  in the 1st type, two adjacent REs perform the code division multiplexing using a two-order Walsh orthogonal code and correspond to dedicated demodulation data reference signals on two layers respectively;
  when the dedicated demodulation data reference signals of the 2nd type occupy 12 REs in the RB, the 12 REs are classified into 6 groups each having 2 REs, wherein
  a 1st group includes the 2nd subcarrier on the 6th and 7th OFDM symbols;
  a 2nd group includes the 2nd subcarrier on the 13th and 14th OFDM symbols;
  a 3rd group includes the 6th subcarrier on the 6th and 7th OFDM symbols;
  a 4th group includes the 6th subcarrier on the 13th and 14th OFDM symbols;
  a 5th group includes the 10th subcarrier on the 6th and 7th OFDM symbols;
  a 6th group includes the 10th subcarrier on the 13th and 14th OFDM symbols;

dedicated demodulation data reference signals corresponding to the 1st and 3rd layers are carried in the 1st, 4th and 5th groups; and dedicated demodulation data reference signals corresponding to the 2nd and 4th layers are carried in the 2nd, 3rd and 6th groups; or, dedicated demodulation data reference signals corresponding to the 1st and 3rd layers are carried in the 2nd, 3rd and 6th groups; and dedicated demodulation data reference signals corresponding to the 2nd and 4th layers are carried in the 1st, 4th and 5th groups; and dedicated demodulation data reference signals corresponding to 2 layers in the same group are subjected to the code division multiplexing using a two-order Walsh orthogonal code;

when the dedicated demodulation data reference signals of the 2nd type occupy 24 REs in the RB, four adjacent REs perform the code division multiplexing using a four-order Walsh orthogonal code and correspond to dedicated demodulation data reference signals on four layers respectively;

24 REs of the 2nd type are classified into 6 groups each having 4 REs, wherein the 1st group includes the 2nd and 3rd subcarriers on the 6th and 7th OFDM symbols;

the 2nd group includes the 2nd and 3rd subcarriers on the 13th and 14th OFDM symbols;

the 3rd group includes the 6th and 7th subcarriers on the 6th and 7th OFDM symbols;

the 4th group includes the 6th and 7th subcarriers on the 13th and 14th OFDM symbols;

the 5th group includes the 10th and 11th subcarriers on the 6th and 7th OFDM symbol; and the 6th group includes the 10th and 11th subcarriers on the 13th and 14th OFDM symbols;

dedicated demodulation data reference signals corresponding to the 1st, 3rd, 5th and 7th layers are carried in the 1st, 4th and 5th groups; and dedicated demodulation data reference signals corresponding to the 2nd, 4th, 6th and 8th layers are carried in the 2nd, 3rd and 6th groups; or, dedicated demodulation data reference signals corresponding to the 1st, 3rd, 5th and 7th layers are carried in the 2nd, 3rd and 6th groups; and dedicated demodulation data reference signals corresponding to the 2nd, 4th, 6th and 8th layers are carried in the 1st, 4th and 5th groups; and dedicated demodulation data reference signals corresponding to 4 layers in the same group are subjected to the code division multiplexing using a four-order Walsh orthogonal code.

* * * * *